US012049755B2

(12) United States Patent
Reusing

(10) Patent No.: US 12,049,755 B2
(45) Date of Patent: Jul. 30, 2024

(54) DEVICE AND METHOD FOR MOVING A BUILDING MODULE ALONG THE GROUND

(71) Applicant: Goliathtech Inc., Magog (CA)

(72) Inventor: Julian L. Reusing, Magog (CA)

(73) Assignee: GOLIATHTECH INC., Quebec (CA)

( * ) Notice: Subject to any disclaimer, the term of this patent is extended or adjusted under 35 U.S.C. 154(b) by 873 days.

(21) Appl. No.: 17/064,881

(22) Filed: Oct. 7, 2020

(65) Prior Publication Data
US 2021/0102366 A1    Apr. 8, 2021

Related U.S. Application Data

(60) Provisional application No. 62/912,583, filed on Oct. 8, 2019.

(51) Int. Cl.
*E04B 1/35* (2006.01)
*B60P 3/00* (2006.01)
*B60P 3/022* (2006.01)
*E04B 1/343* (2006.01)

(52) U.S. Cl.
CPC .................. *E04B 1/35* (2013.01); *B60P 3/00* (2013.01); *E04B 1/34336* (2013.01); *E04B 2001/3577* (2013.01)

(58) Field of Classification Search
CPC .................. E04B 1/35; E04B 1/34336; E04B 2001/3577; E04B 2001/3588; B60P 3/00; E04G 21/14; B66F 11/00; B66F 19/00
See application file for complete search history.

(56) References Cited

U.S. PATENT DOCUMENTS

| 3,884,494 | A |   | 5/1975 | Ashby et al. |
|---|---|---|---|---|
| 4,198,797 | A |   | 4/1980 | Soble |
| 6,027,295 | A | * | 2/2000 | Geppert .................... B66F 1/00 414/427 |
| 6,254,132 | B1 |   | 7/2001 | Lindsay |
| 11,390,364 | B2 | * | 7/2022 | Taylor ..................... B66F 11/00 |
| 2007/0266650 | A1 |   | 11/2007 | Cohen et al. |

FOREIGN PATENT DOCUMENTS

WO    WO-2004065710 A1 *  8/2004  ............... B60P 1/00

* cited by examiner

*Primary Examiner* — John D Walters
(74) *Attorney, Agent, or Firm* — Harness, Dickey & Pierce, PLC

(57) ABSTRACT

A device for moving a building module along the ground, the device includes: a first frame member and a second frame member, spaced apart from the first frame member. The device also includes a first wheel assembly having at least one first wheel, the first wheel assembly being operatively coupled to the first frame member, and a second wheel assembly includes at least one second wheel, the second wheel assembly being spaced apart from the first wheel assembly and operatively coupled to the second frame member. The device further includes at least one cross-member having a first end removably secured to the first frame member and a second end removably secured to the second frame member.

20 Claims, 35 Drawing Sheets

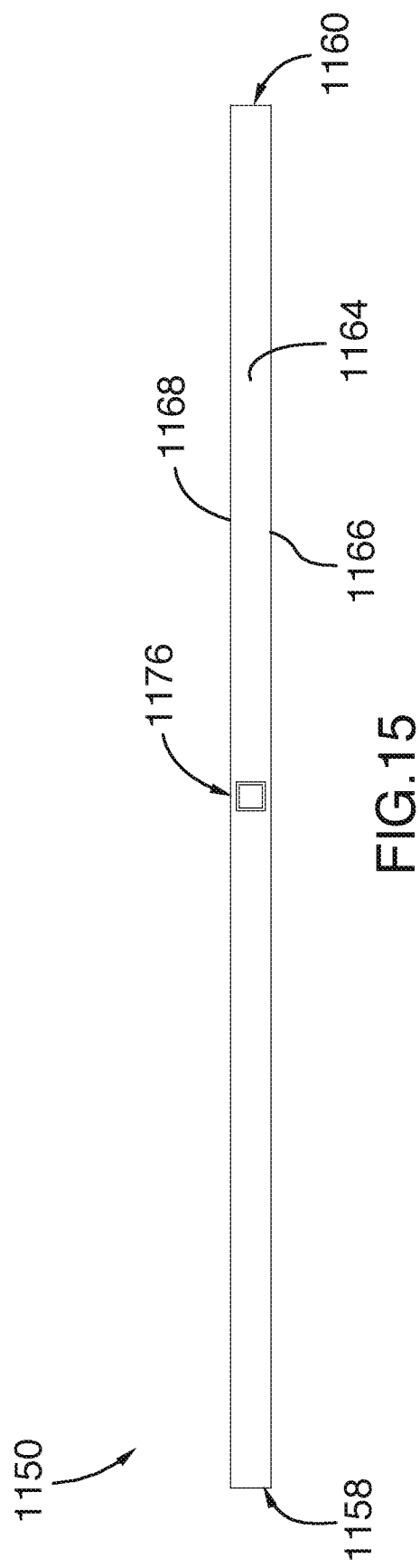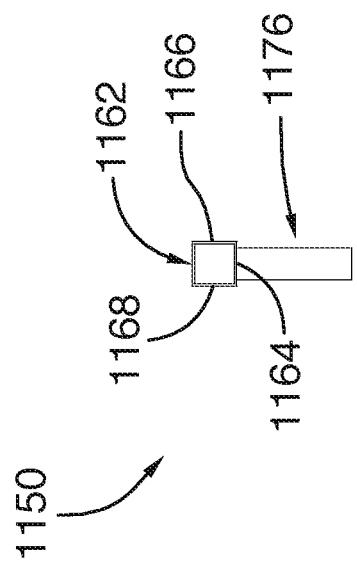

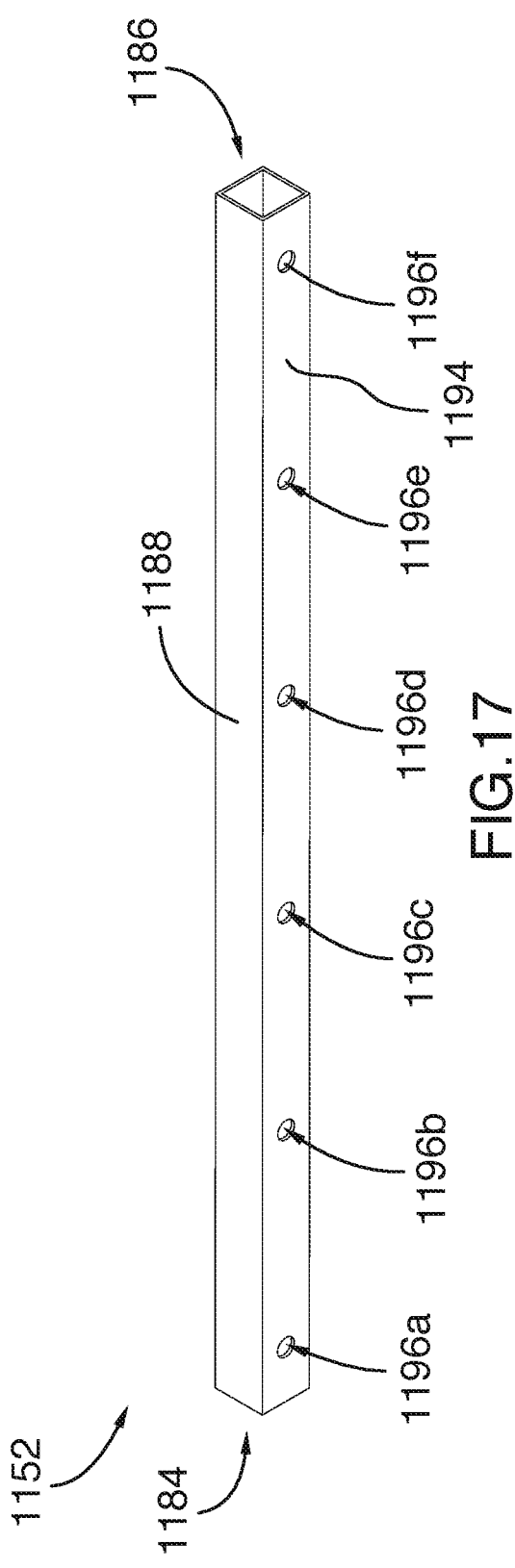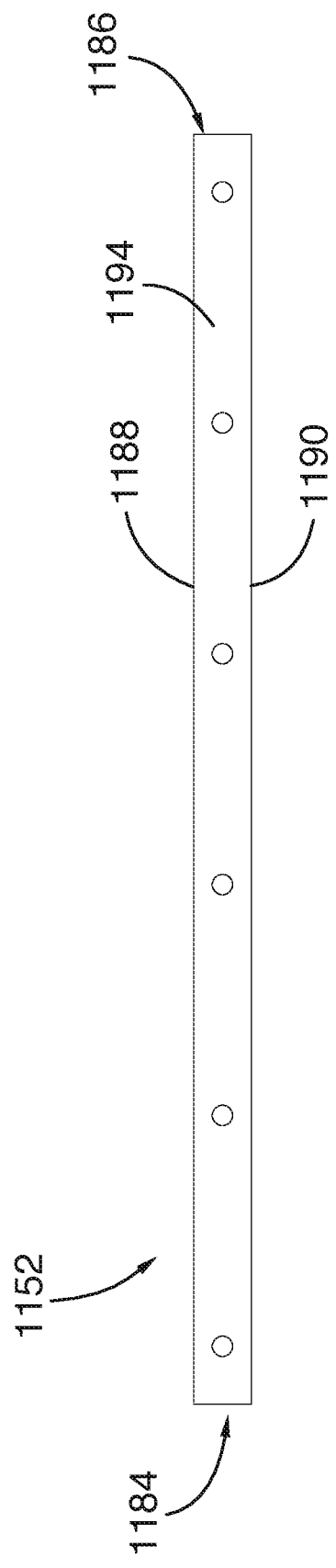

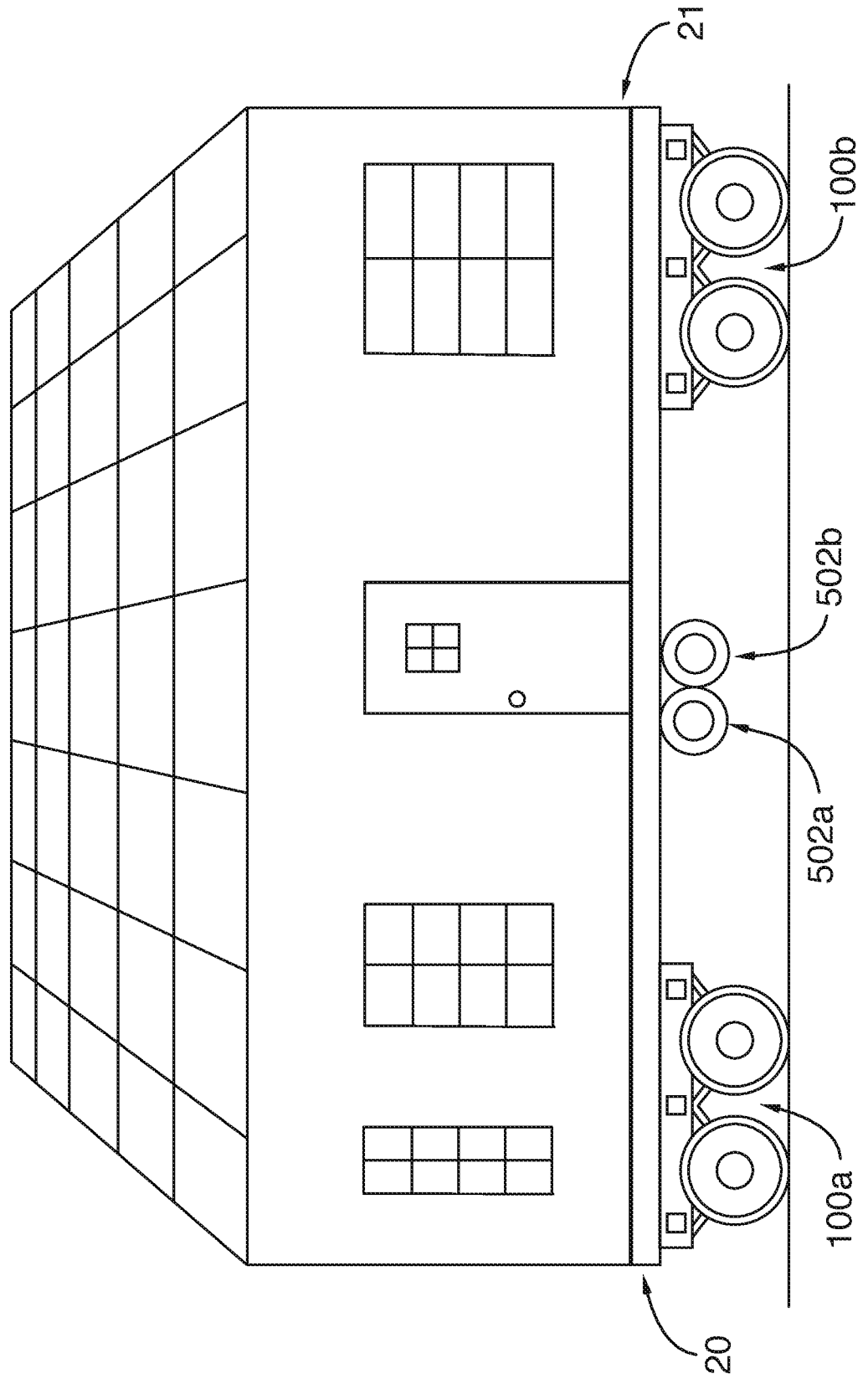

DEVICE AND METHOD FOR MOVING A BUILDING MODULE ALONG THE GROUND

CROSS-REFERENCE

This application claims the priority benefit of United States provision patent application Ser. No. 62/912,583 filed on Oct. 8, 2019, which is incorporated by reference herein.

TECHNICAL FIELD

The present technology relates to devices for moving a building module along the ground.

BACKGROUND

Traditionally, buildings were built entirely or largely on-site, i.e., on the site which the building was intended to occupy upon its completion. Such buildings may be referred to as "stick-built" in that traditionally they were built using lumber having been transported to the building site.

In contrast to "stick-built" structures, there are structures that are largely built in a factory (or similar facility) remote from the site which the building is intended to occupy upon its completion. Typically, such structures are modular in that several different modules are separately manufactured at the factory, the various building modules are transported to the site (e.g., via truck) and are put into place (e.g., side-by-side, end-to-end, etc.) by appropriate machinery (e.g., a crane). These structures are known as modular buildings (and also manufactured buildings). While it is common for modular buildings to be made of several building modules, no particular number is required. Indeed, modular buildings consisting of a single module are known as well. Further, while it is common for modular buildings to serve as dwellings, no such particular use is required. Typically, such structures are placed on a permanent foundation, e.g., a poured concrete foundation. Modular buildings are not intended to be moved from place-to-place once put into place on a site.

Modular buildings to be used as dwellings (sometimes called "modular homes") are different than what is known as "mobile homes". A mobile home is a prefabricated, factory-built structure that is permanently attached to a chassis or frame before being transported to a site (either by being towed (e.g., on its own wheels) or trucked (e.g., put the trailer of a tractor trailer). Mobile homes, although commonly left for extended periods of time in one place, can be moved from place to place, if required or desired. While mobile homes are not commonly placed on a permanent foundation, they are commonly placed on concrete blocks on site (concrete blocks have many different names across the English-speaking world, e.g., cement blocks, breeze blocks, cinder blocks, construction blocks, Besser blocks, hollow blocks, concrete masonry units, etc.).

Both modular buildings and mobile homes have installation conditions and/or procedures that could be ameliorated.

With respect to modular buildings, for example, their installation on commonly used poured concrete foundations may require (relatively) costly excavation and levelling. Further, it may take a substantial period of time (e.g., from three to four weeks) for the concrete to dry, meaning that a month (or more) may typically be required from beginning to end of the complete modular building installation process. Finally, in climates where the ground freezes in wintertime (e.g., the northern United States and most of Canada), it is difficult, see impossible to pour concrete (and thus start the installation process of a modular building) in winter.

Issues with respect to mobile homes are different, but exist. For example, many mobile homes have been installed in areas that are prone to flooding. Typically, conventionally, mobile homes were not attached or were not sufficiently anchored to the ground. When floods occurred, the mobile homes suffered damage by being moved off their concrete blocks by the flood waters and/or by flood waters entering the mobile home. Climate change may increase the likelihood of floods occurring in some areas and may make flooding occur in areas where it has not traditionally occurred.

One solution that has been adopted in the past is to install structures on piles (e.g. driven piles, pin piles, helical piles and the like) that have been installed into the ground. Installing piles into the ground is much faster than making a poured concrete foundation, as it may be done in a day or two depending on the number of piles to be installed. Further, piles may be installed in wintertime as they may be driven into frozen ground; and they do not have to dry. Also, piles can be installed into the ground so as to leave a certain length exposed above the ground, meaning any structure installed on the piles can be at a certain distance above the ground. Finally, structures installed on piles may be securely affixed to the piles rather than simply resting on them.

One inconvenience of installing structures on piles, be they modules of modular buildings, mobile homes, etc. is actually maneuvering the structures onto the piles, as traditional means of transporting the structure to the site were not designed for this purpose, and are not optimal (traditional transport means may have worked well enough in some instances to install structures on prior conventional concrete). There have also been attempts at designing devices for moving around such structures at their on-site location, but again they were only designed for concrete, and not for installation on piles.

There is therefore a need for an improved device for moving such structures.

SUMMARY

It is an object of the present technology to ameliorate at least some of the inconveniences present in at least some of the prior art.

According to a broad aspect, there is provided a device for moving a building module along a ground surface, the device comprising:
a first frame member;
a second frame member, spaced apart from the first frame member;
a first wheel assembly comprising at least one first wheel, the first wheel assembly being operatively coupled to the first frame member;
a second wheel assembly comprising at least one second wheel, the second wheel assembly being spaced apart from the first wheel assembly and operatively coupled to the second frame member; and
at least one cross-member having a first end removably secured to the first frame member and a second end removably secured to the second frame member.

In one feature, the first frame member comprises at least one first frame member slot and the second frame member comprises at least one second frame member slot, the first end of the at least one cross-member being removably received in the at least one first frame member slot and the second end of the at least one cross-member being removably received in the at least one second frame member slot.

In another feature, the first frame member comprises at least one first frame member sleeve and the second frame member comprises at least one second frame member sleeve, the first end of the at least one cross-member being removably received in the at least one first frame member sleeve and the second end of the at least one cross-member being removably received in the at least one second frame member sleeve.

In still another feature, the at least one cross-member comprises a telescopic cross-member. Preferably, the telescopic cross-member comprises a central loading portion and at least one side portion, the at least one side portion being movable relative to the central loading portion for adjusting a length of the telescopic cross-member. More preferably, the central loading portion is a central loading tube and the side portion is a side tube.

In a further feature, the device comprises three cross-members.

In still a further feature, the first wheel assembly comprises a first leg assembly having a top end connected to the first frame member and a bottom end rotatably supporting the at least one first wheel, and the second wheel assembly comprises a second leg assembly having a top end connected to the second frame member and a second end rotatably supporting the at least one second wheel.

In a yet a further feature, the first leg assembly and the second leg assembly are telescopic.

In another feature, the first wheel assembly comprises a first longitudinal frame rotatably supporting the at least one first wheel and at least one first upright member, the first upright member having a bottom end connected to the longitudinal frame and a top end connected to the first frame member, and the second wheel assembly comprises a second longitudinal frame rotatably supporting the at least one second wheel and at least one second upright member, the second upright member having a bottom end connected to the longitudinal frame and a top end connected to the second frame member. Preferably, the at least one first upright member and the at least one second upright member are telescopic.

In yet another feature, the first wheel assembly comprises two first wheels, and wherein the second wheel assembly comprises two second wheels.

In still another feature, the device further comprises a third wheel assembly, the third wheel assembly being positioned between the first wheel assembly and the second wheel assemblies, the third wheel assembly being further removably secured to the at least one cross-member.

According to another broad aspect, there is provided a device for moving a building module along a ground surface, the device comprising:
 a frame mounted on a drive assembly for allowing the device to move along the ground;
 a lifting assembly mounted to the frame, the lift assembly being operable to move between a lower position and a raised position; and
 a support beam assembly mounted on the lift assembly, the support beam assembly configured to engage the building module;
 wherein when the lifting assembly moves from the lower position to the raised position, it urges the support beam assembly to move upwardly, whereas when the at least one actuator moves from the raised position to the lower position, it urges the support beam assembly to move downwardly.

In one feature, the drive assembly comprises a first track assembly located on a first side of the frame and a second track assembly located on a second side of the frame.

In another feature, the lift assembly comprises at least one actuator. Preferably, the actuator is a hydraulic actuator.

In still another feature, the device further comprises a turning table assembly mounted between the frame and the support beam assembly, the turning table assembly allowing the support beam assembly to rotate relative to the frame about a vertical axis. Preferably, the turning table assembly allows the support beam assembly to rotate relative to the frame when the support beam assembly is positioned at a determined height.

In a further feature, the support beam assembly comprises a central loading portion mounted on the lift assembly and at least one side portion, the at least one side portion being movable between a retracted position and an extended position to adjust a length of the support beam assembly. Preferably, the support beam assembly further comprises at least one support platform mounted to the at least one side portion, the support platform being configured to engage the building module. More preferably, the building module comprises at least one structural frame member and the at least one platform is configured for engaging the at least one structural frame member of the building module.

In an additional feature, the device further comprises an external power source, the external power source being operatively coupled for providing power to at least one of the drive assembly and the lift assembly.

In another feature, the external power source comprises a hydraulic power source.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first component" and "third component" is not intended to imply any particular order, type, chronology, hierarchy or ranking (for example) of/between the components, nor is their use (by itself) intended imply that any "second component" must necessarily exist in any given situation.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 15 is a bottom plan view of the central loading tube shown in FIG. 13;

FIG. 16 is a left-side view of the central loading tube shown in FIG. 13;

FIG. 17 is a rear perspective view of a side tube of a cross-member of the device shown in FIG. 4, in accordance with one embodiment;

FIG. 18 is a rear elevation view of the side tube shown in FIG. 17;

FIG. 33 is a schematic side representation of the pair of moving devices positioned underneath the building module to be moved shown in FIG. 32;

DETAILED DESCRIPTION OF CERTAIN EMBODIMENTS

Figure 1:
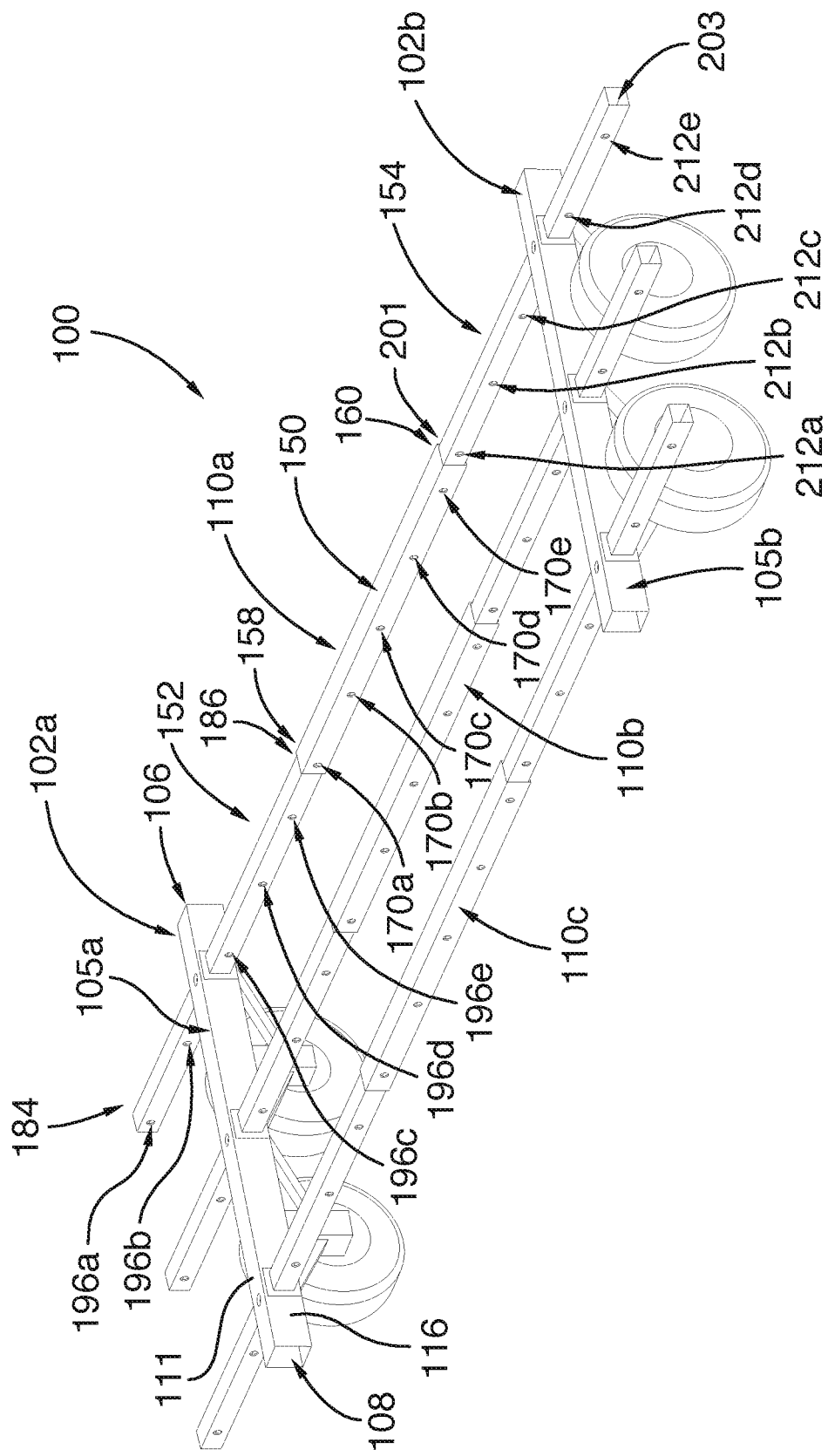
FIG. 1 is a rear right perspective view of a device for moving a building module in accordance with one embodiment.
Figure 2:
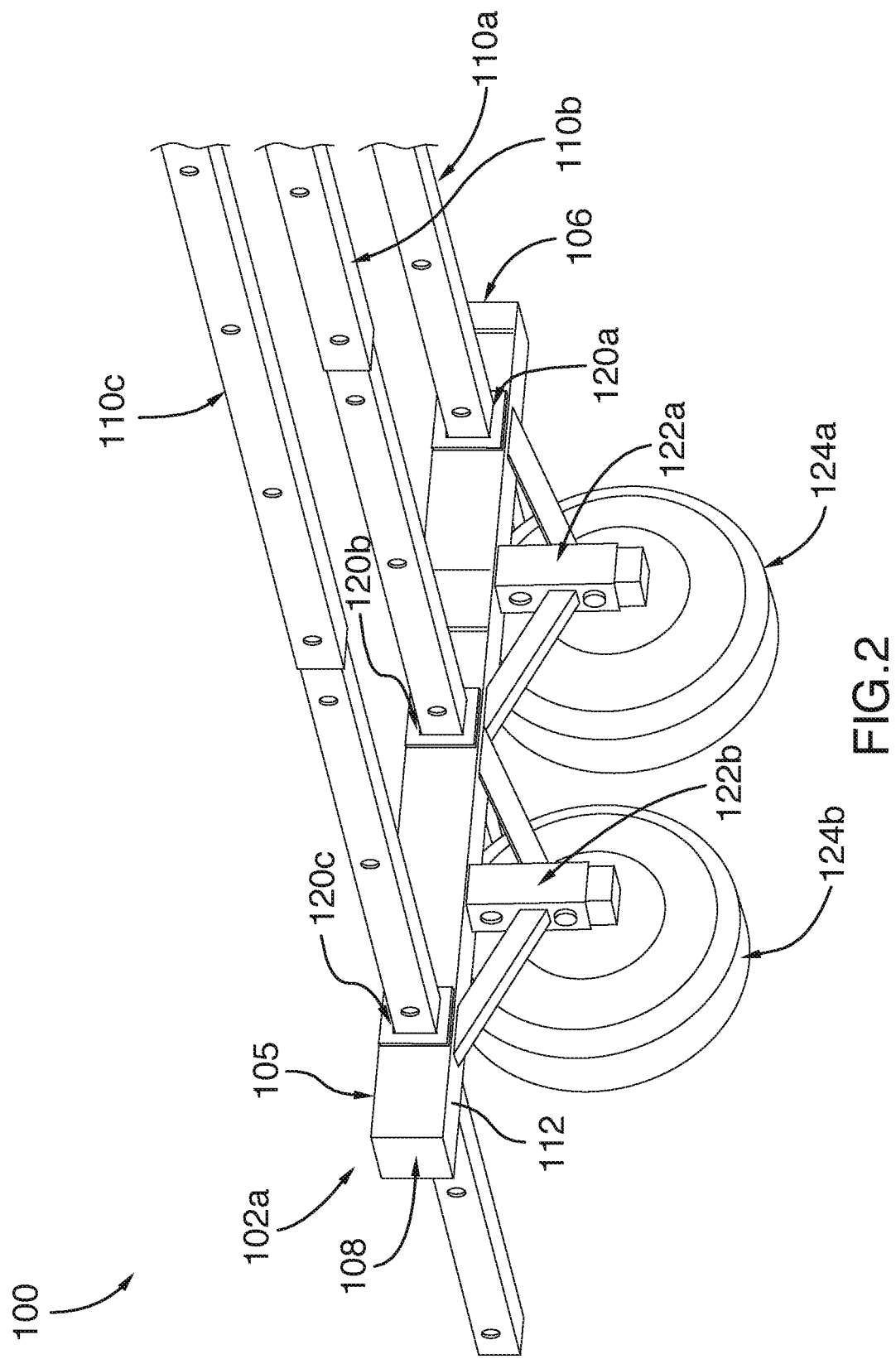
FIG. 2 is a partial rear right perspective view of the device shown in FIG. 1.
Figure 32:
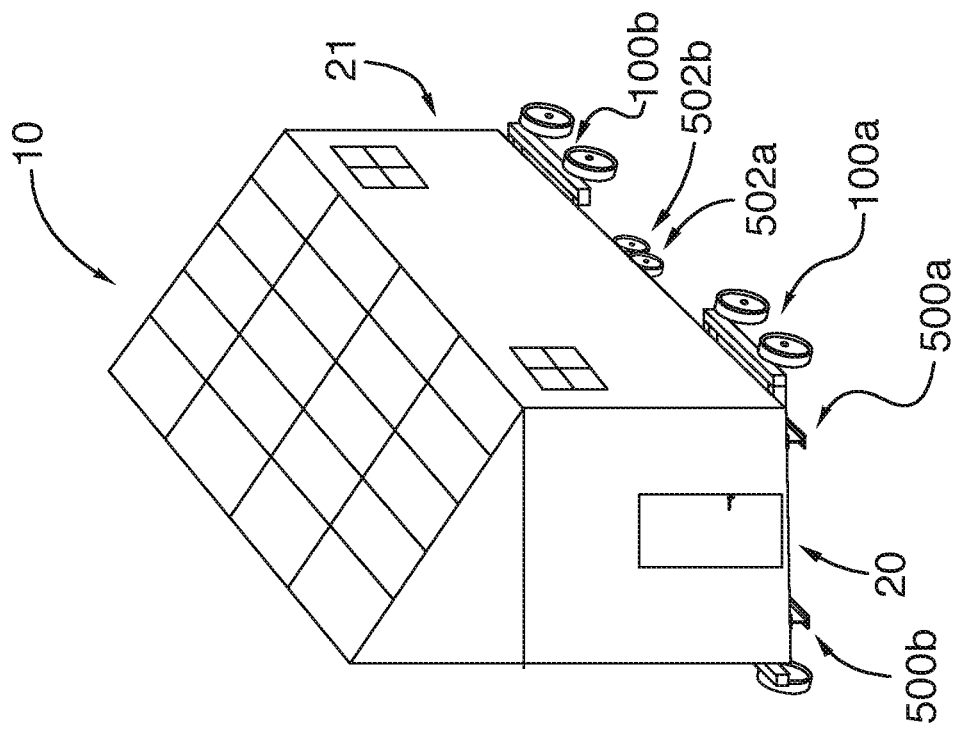
FIG. 32 is a schematic perspective representation of a pair of moving devices positioned underneath a building module to be move, in accordance with one embodiment.
Figure 31:
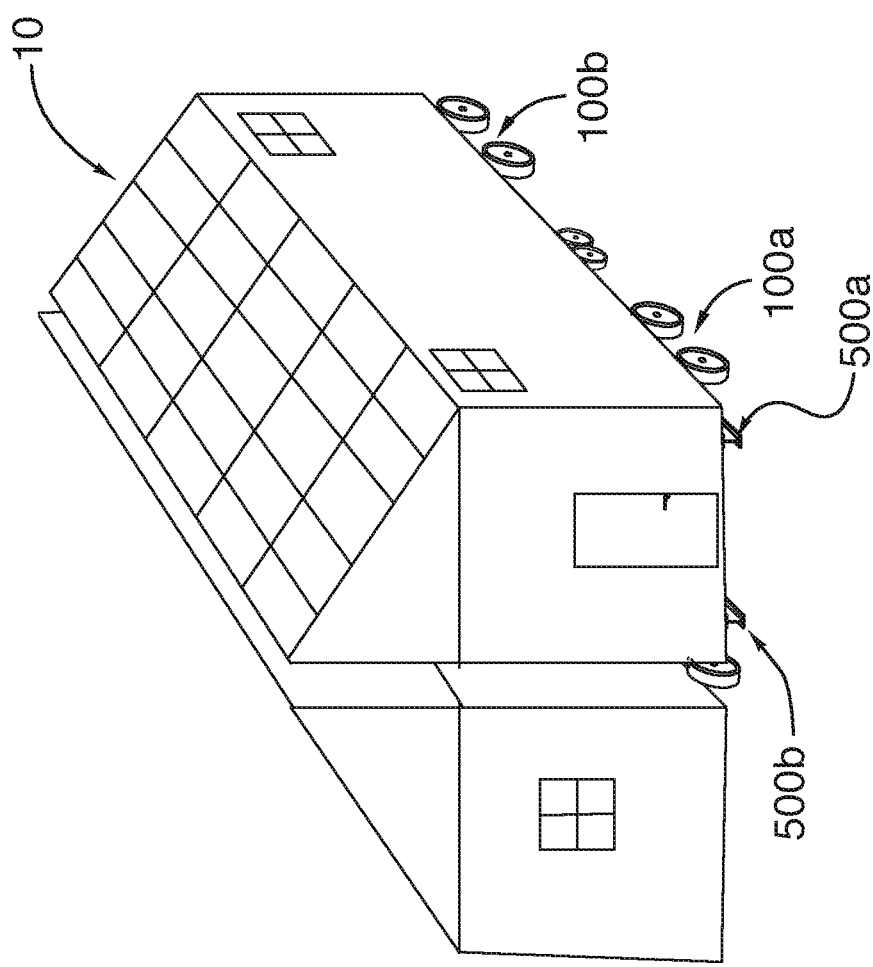
FIG. 31 is a schematic perspective representation of a pair of moving devices positioned underneath a building module to be positioned on the side of another, already positioned building module, in accordance with one embodiment.
Figure 34:
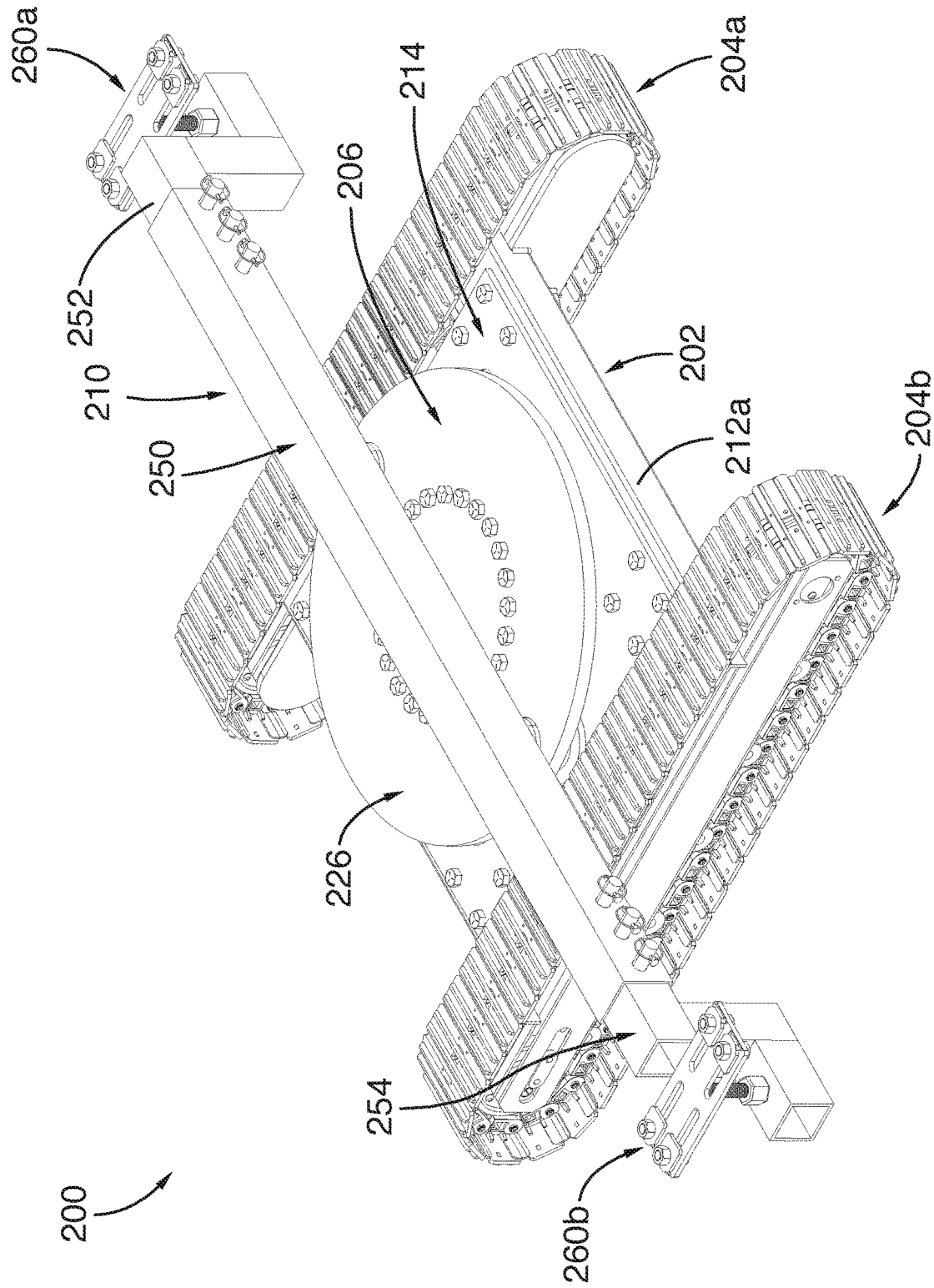
FIG. 34 is a front left perspective of a device for moving a building module in accordance with yet another embodiment.
Figure 35:
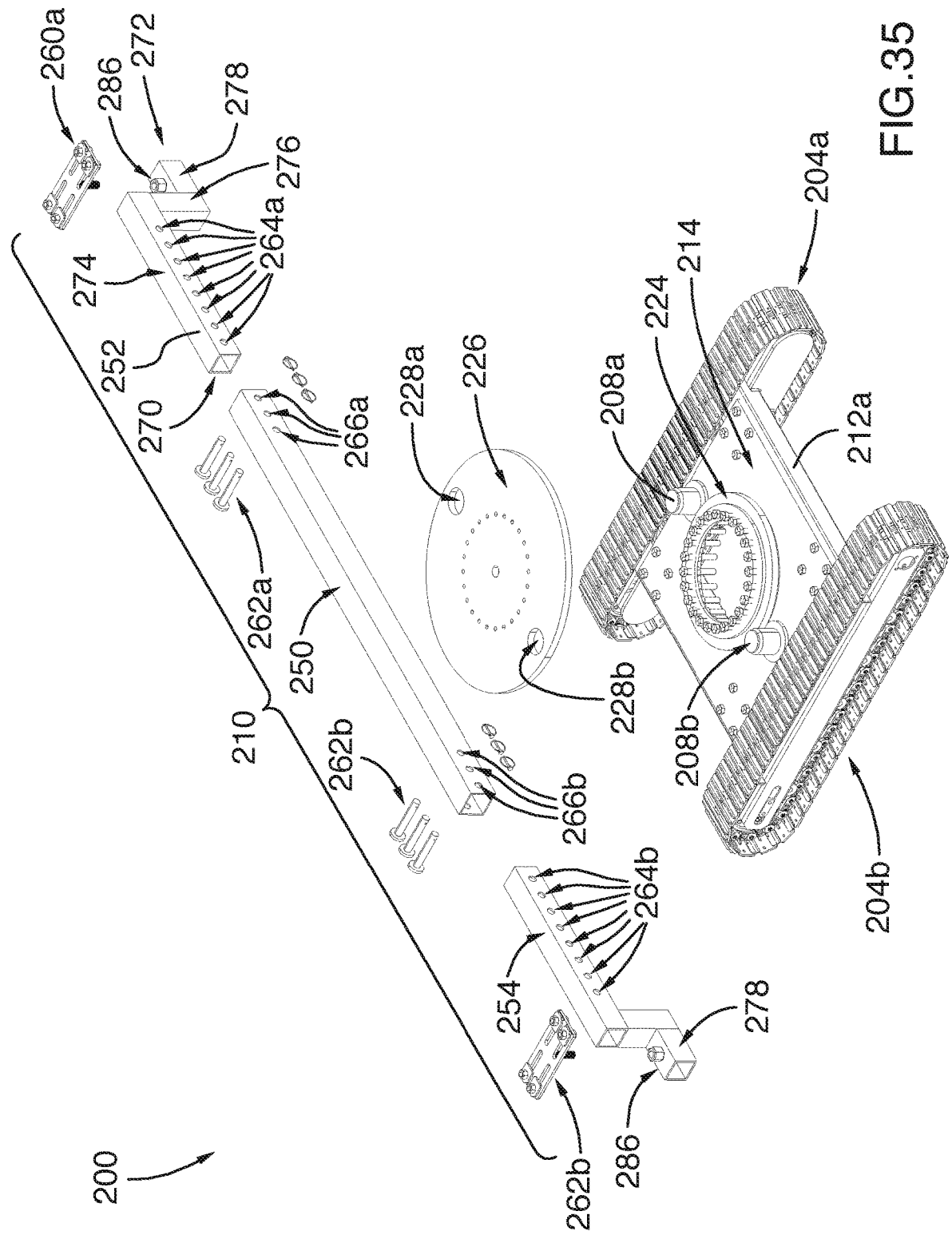
FIG. 35 is a partially exploded, front left perspective view of the device shown in FIG. 34.

Referring first to FIG. 1, there is shown a first embodiment of the present technology, a building module moving device 100 for displacing a building module 10 (shown in FIGS. 31 to 33). As it will be described in greater details below, the moving device 100 is configured to receive a building module 10 thereon.

In the illustrated embodiment, the moving device 100 comprises a left and right wheel assemblies 102a, 102b and three telescopic cross-members 110a-110c, extending parallel to one another and connecting the wheel assemblies 102a, 102b to one another, as it will be described in greater details below.

The left and right wheel assemblies being identical to one another, only left wheel assembly 102a will be described. It will be appreciated that a similar description also applies to right wheel assembly 102b, with proper adaptation. Left wheel assembly 102a comprises a longitudinal frame members 105 having a front end 106, a rear end 108, as well as top, bottom, left and right faces 111, 112, 114, 116. Extending between the left and right faces 114, 116 of the longitudinal frame member 105 are three square slots 120a-120c, distributed between the front end 106 and the rear end 108. As it will become apparent below, square slots 120a-120c are configured for receiving therein a portion of a corresponding telescopic cross-member 110a-110c at the time of assembly of the moving device 100. In one embodiment, frame member is a HSS square tube, ⅜"×5"×5", 48" long.

Figure 3:
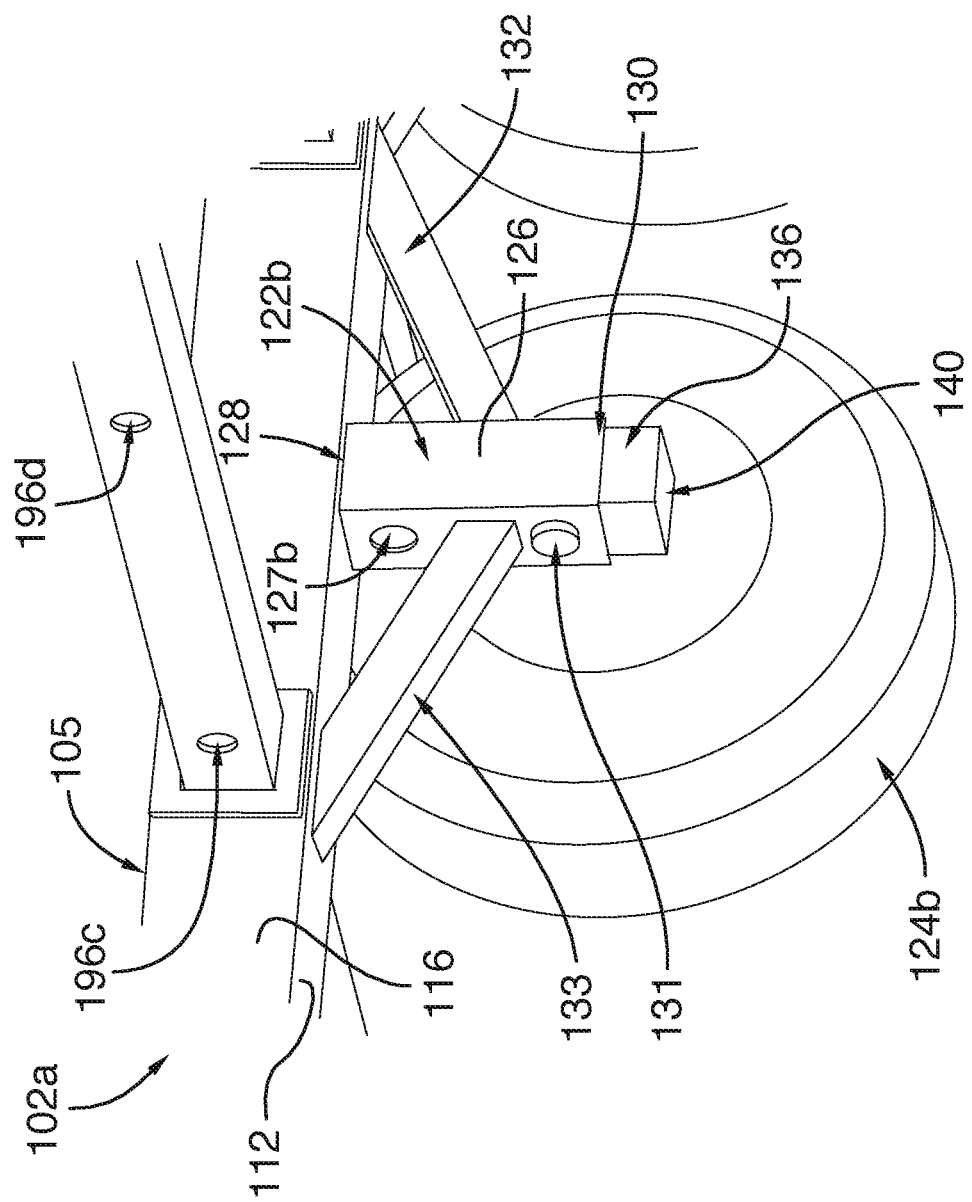
FIG. 3 is an enlarged, partial view of the device shown in FIG. 2, for better showing a leg assembly.
Figure 4:
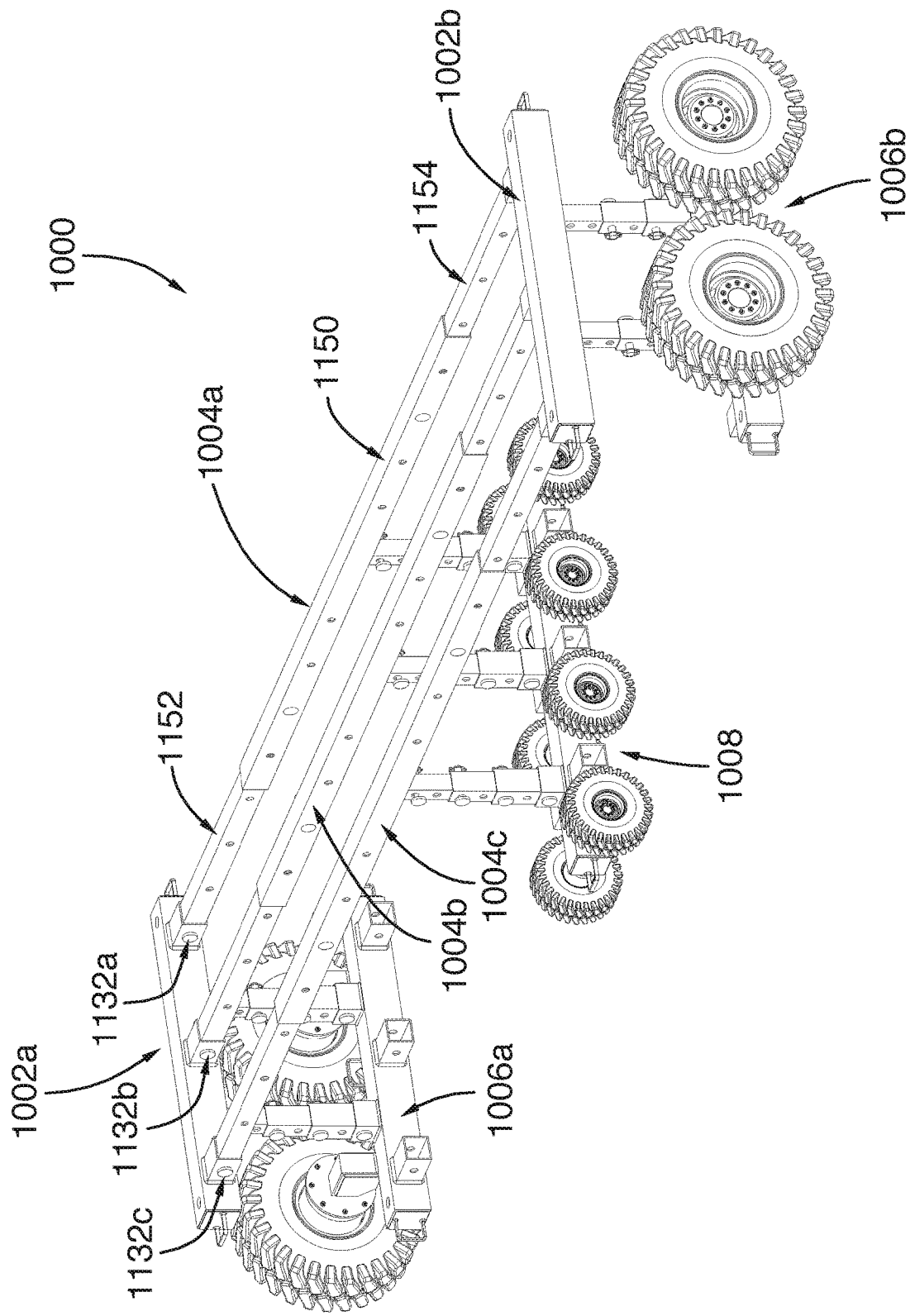
FIG. 4 is a rear right perspective of a device for moving a building module in accordance with another embodiment.
Figure 5:
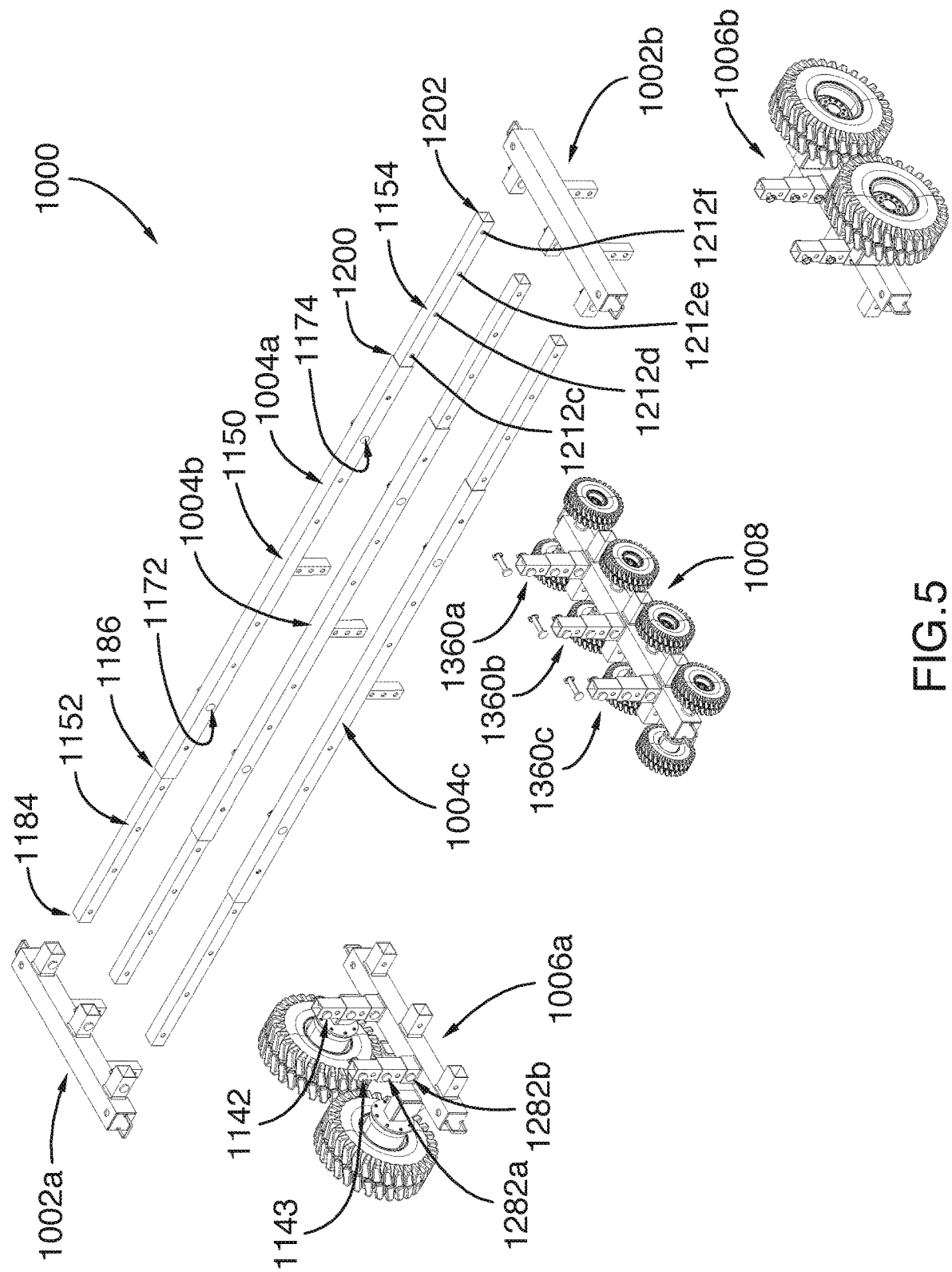
FIG. 5 is a partially exploded, rear right perspective view of the device shown in FIG. 4.
Figure 6:
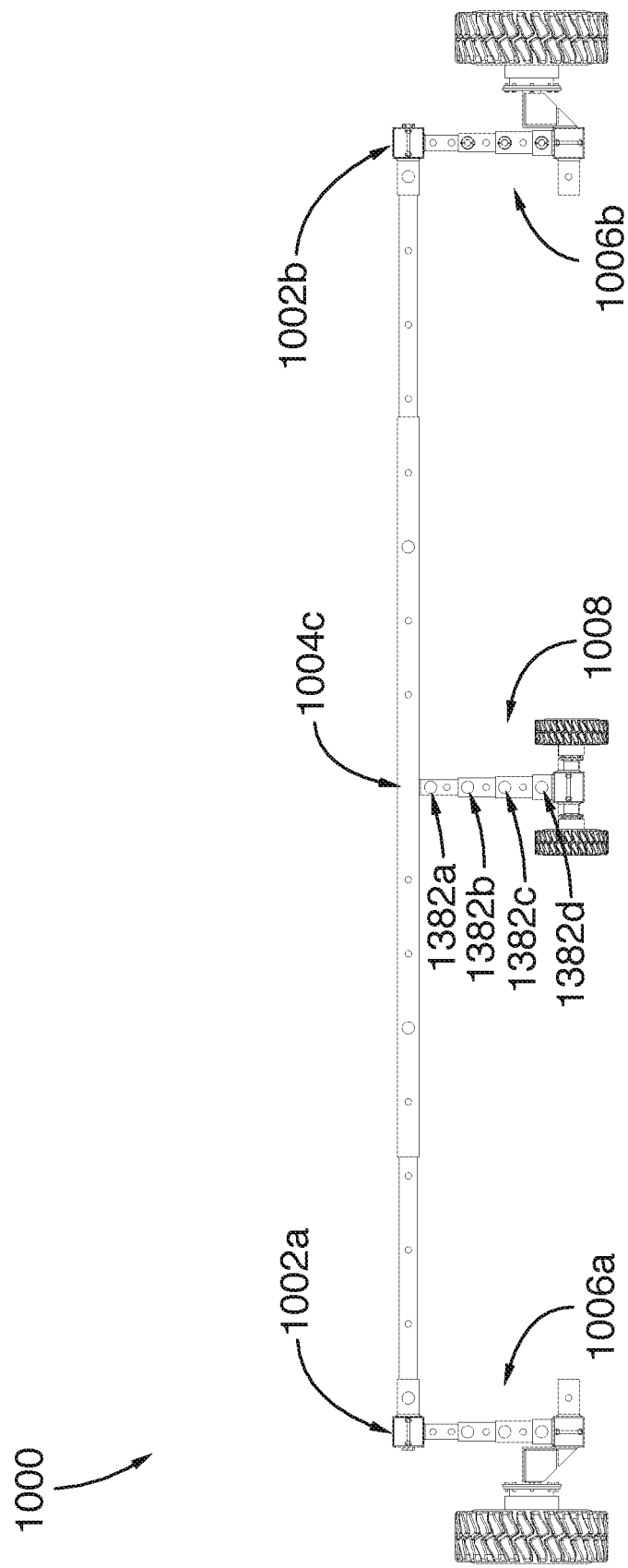
FIG. 6 is a rear elevation view of the device shown in FIG. 4.
Figure 7:
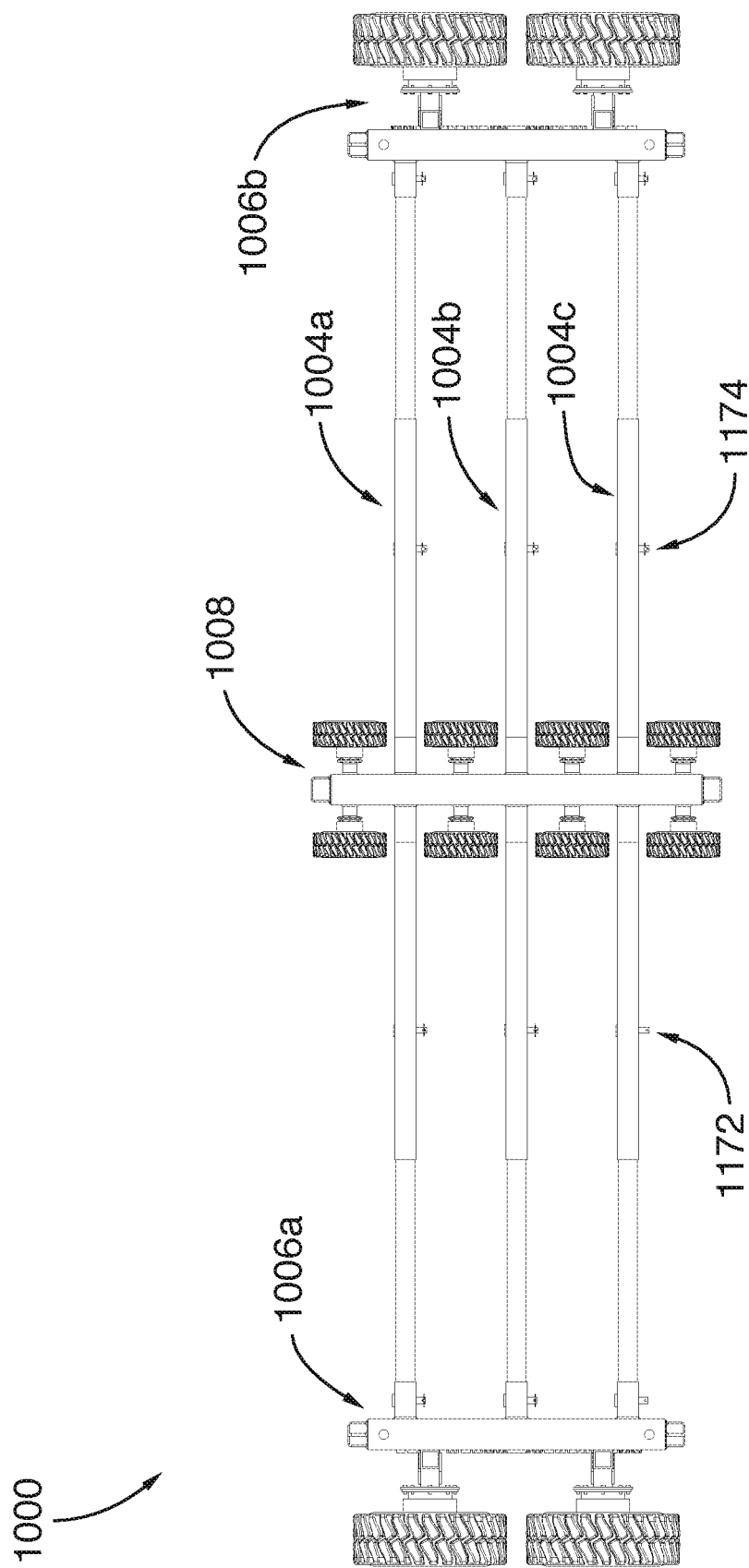
FIG. 7 is a top plan view of the device shown in FIG. 4.
Figure 8:
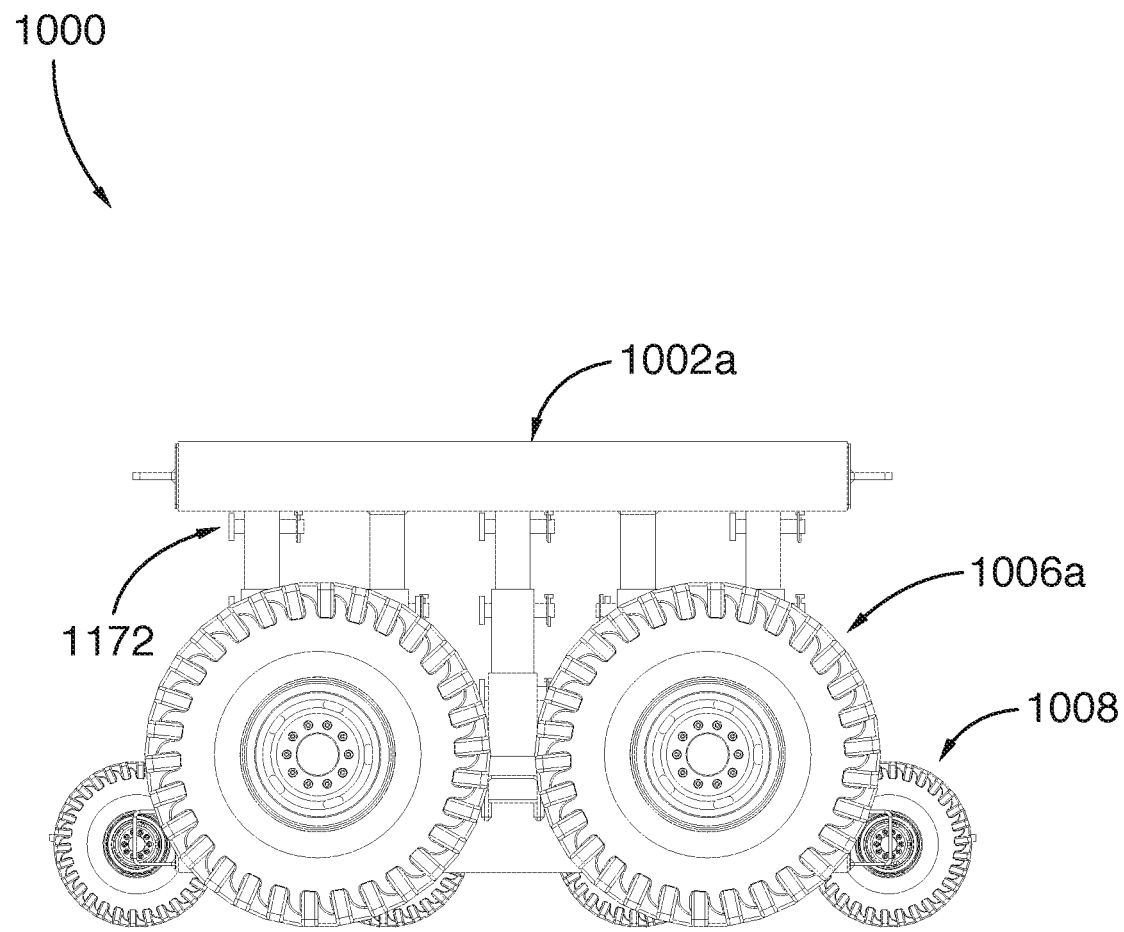
FIG. 8 is a left-side perspective view of the device shown in FIG. 4.
Figure 9:
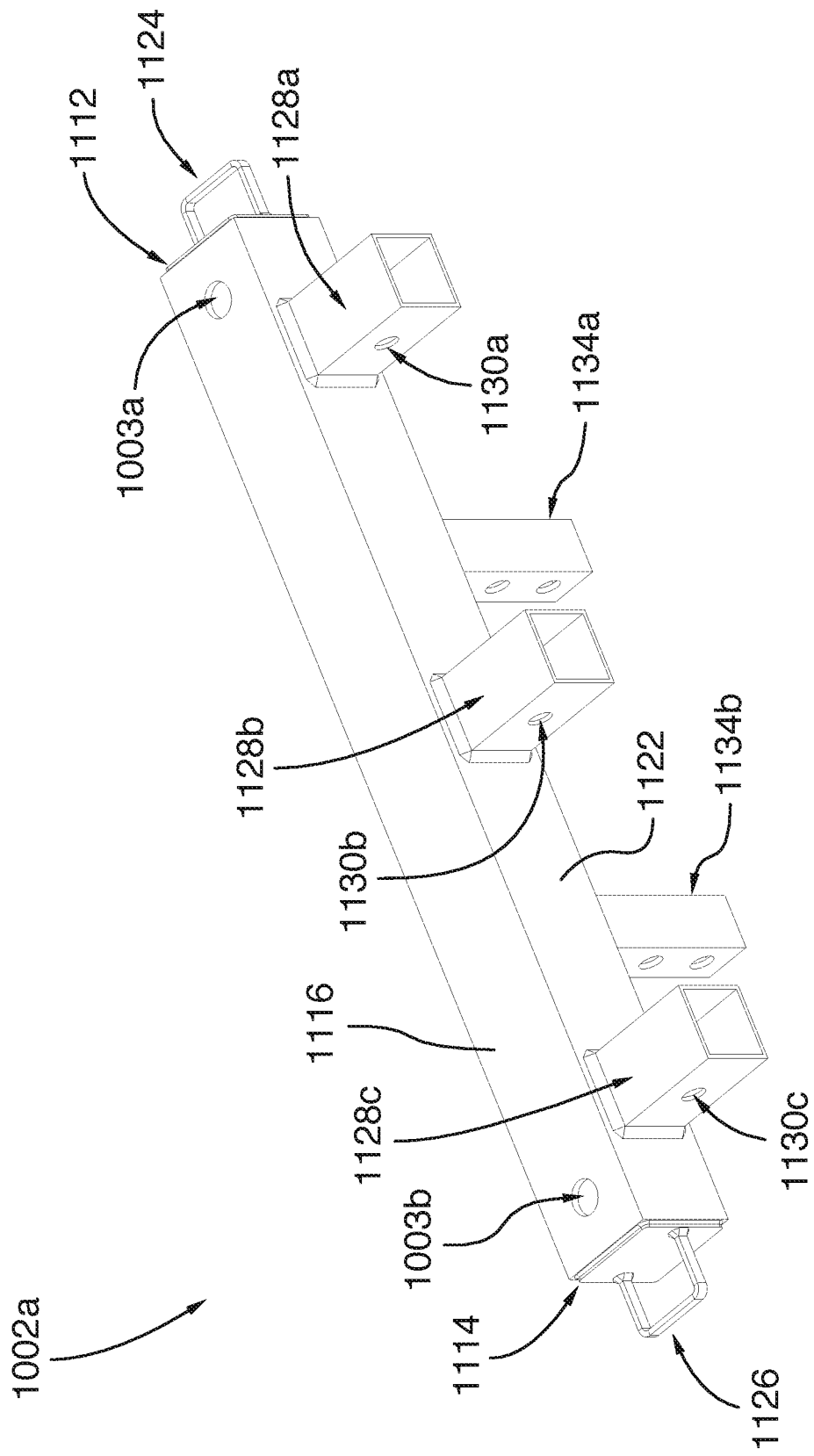
FIG. 9 is a rear right perspective view of a frame member of the device shown in FIG. 4, in accordance with one embodiment.
Figure 10:
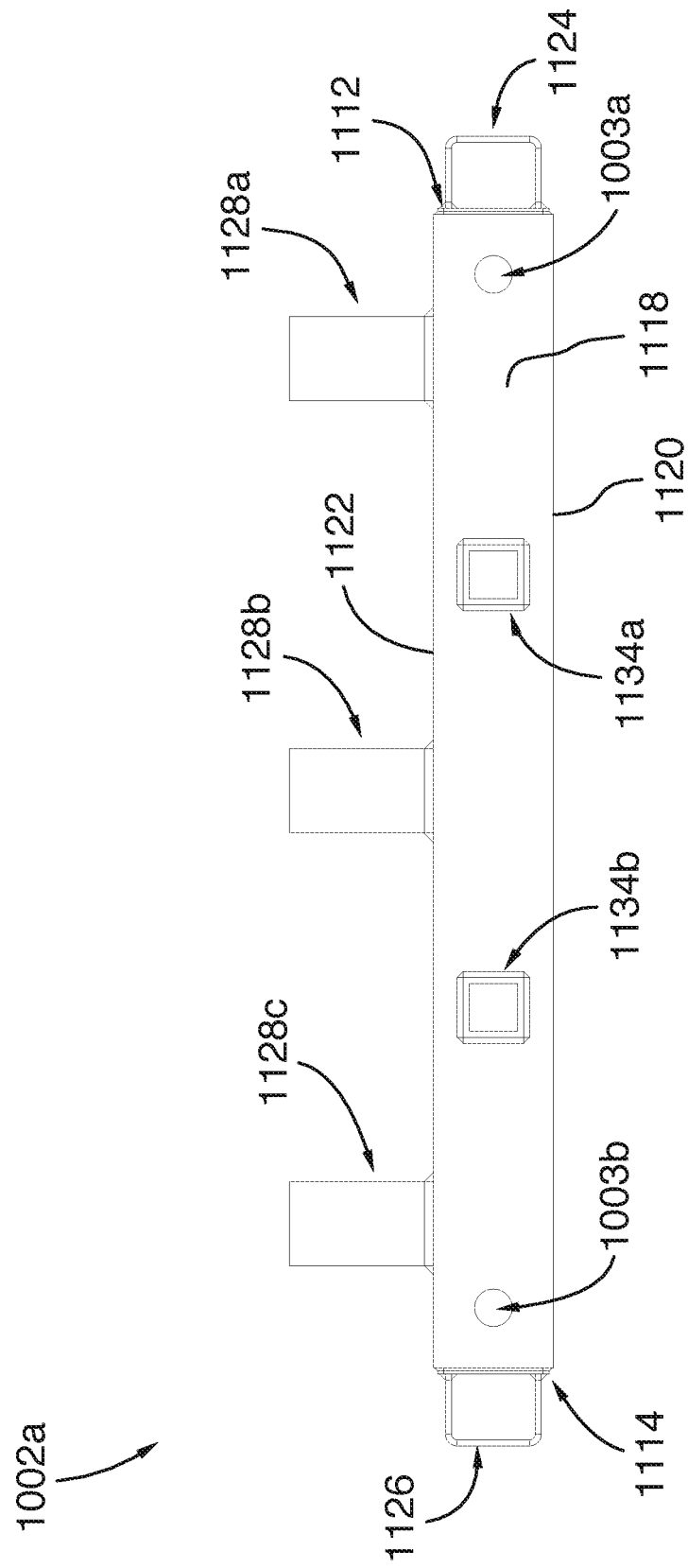
FIG. 10 is a bottom plan view of the frame member shown in FIG. 9.
Figure 11:
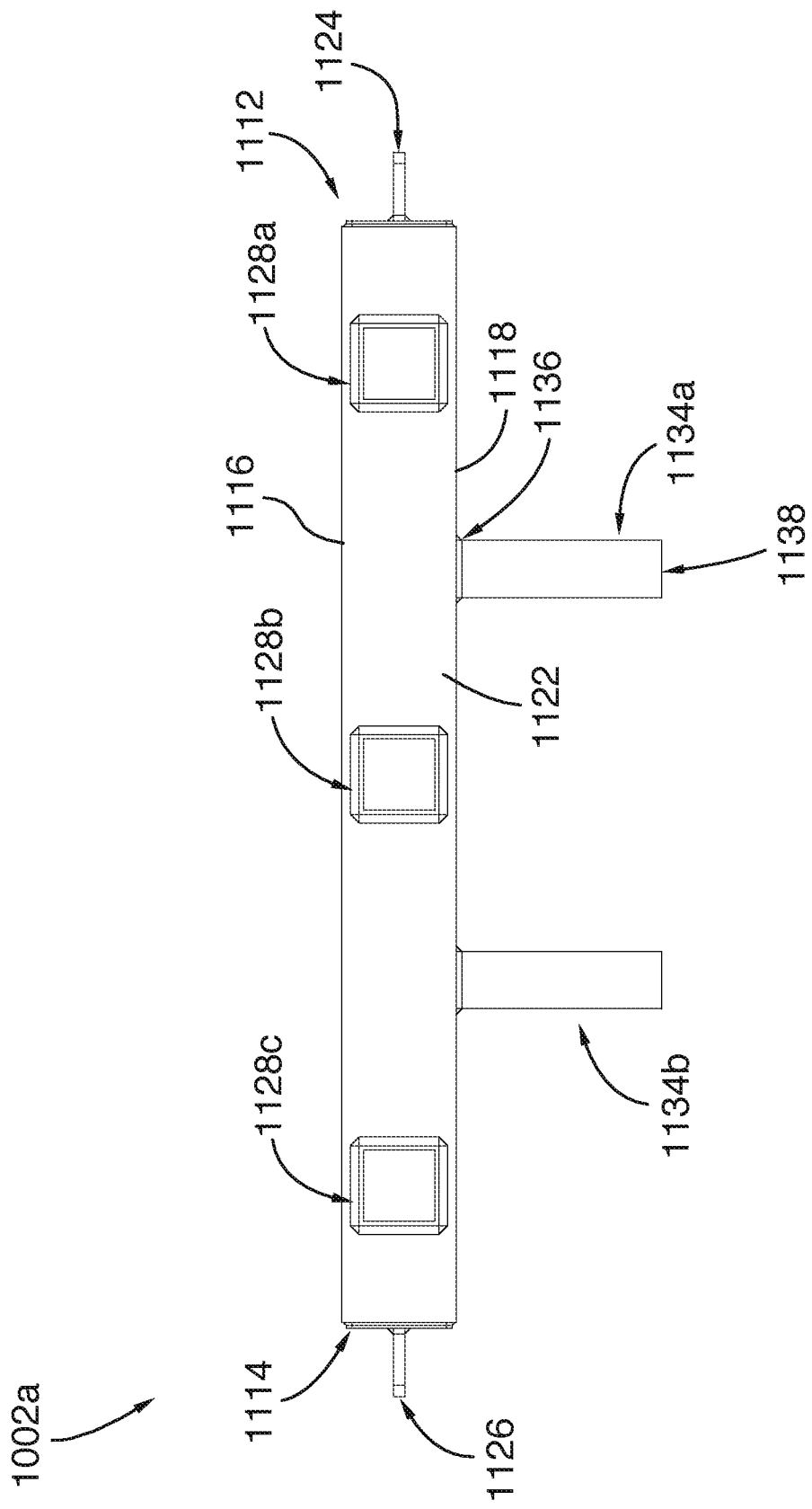
FIG. 11 is a right-side view of the frame member shown in FIG. 9.
Figure 12:
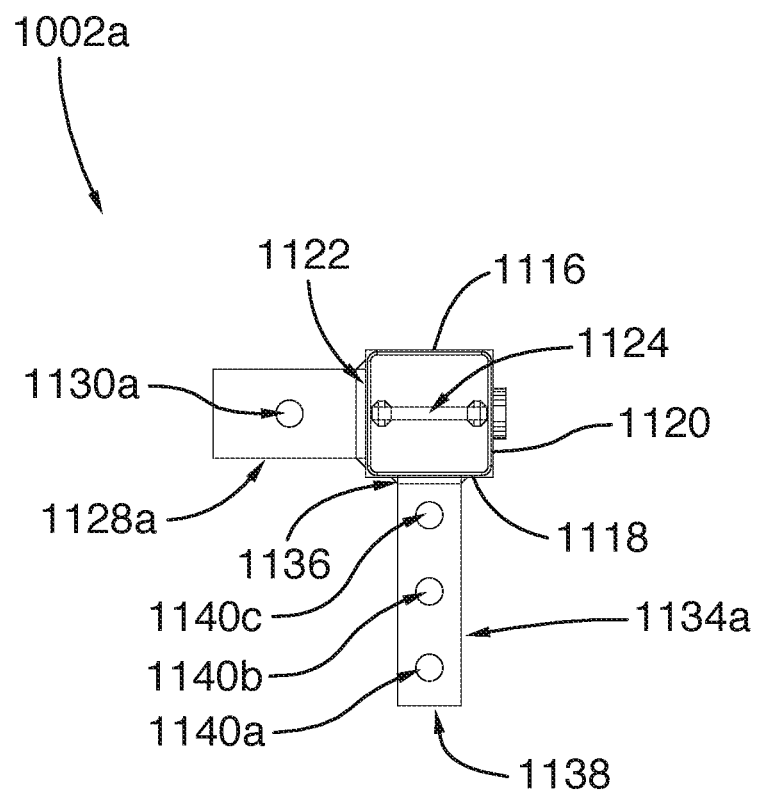
FIG. 12 is a front elevation view of the frame member shown in FIG. 9.
Figure 13:
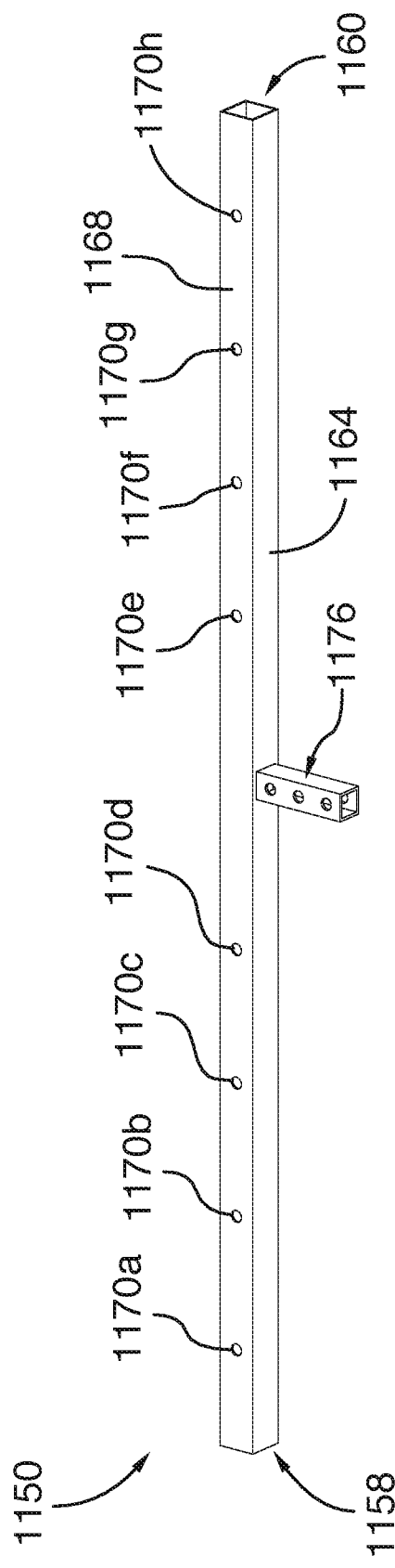
FIG. 13 is a rear perspective view of a central loading tube of a cross-member of the device shown in FIG. 4, in accordance with one embodiment.
Figure 14:
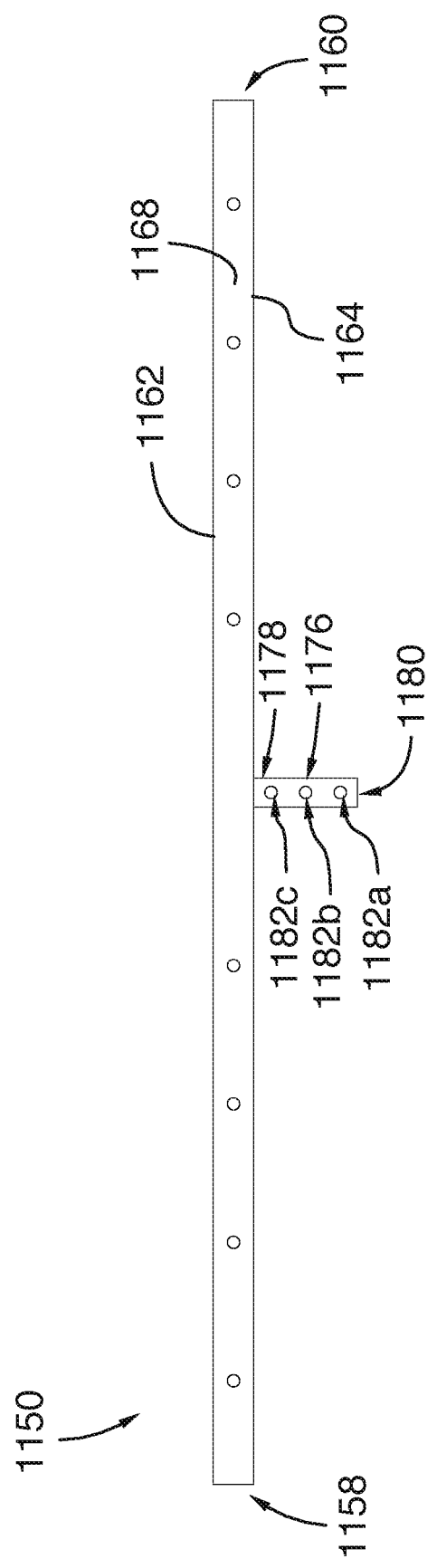
FIG. 14 is a rear elevation view of the central loading tube shown in FIG. 13.
Figure 19:
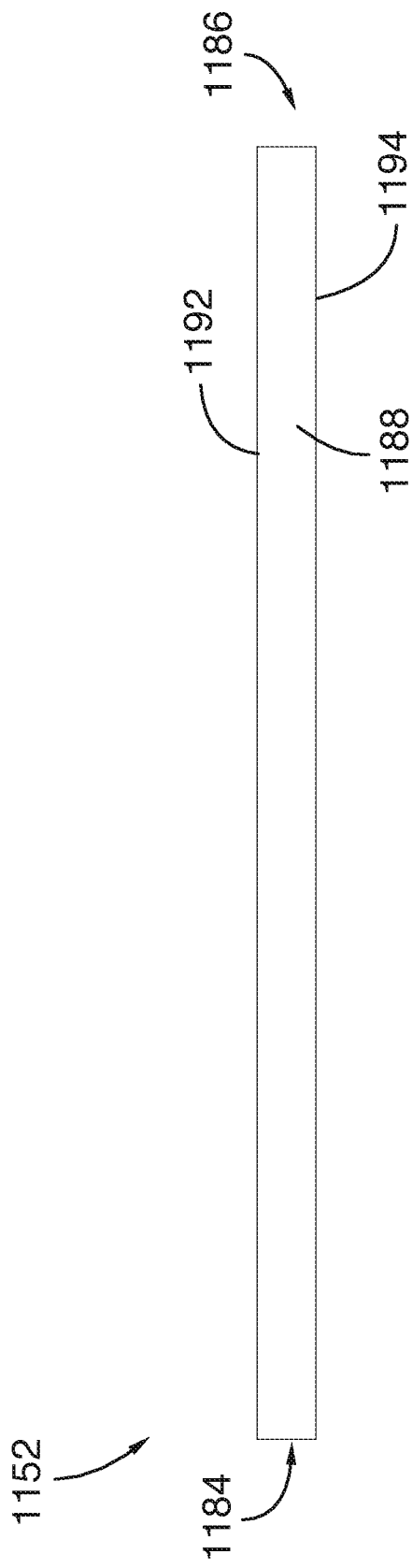
FIG. 19 is a bottom plan view of the side tube shown in FIG. 17.
Figure 20:
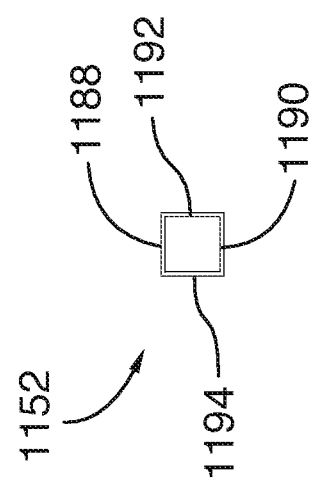
FIG. 20 is a left-side view of the side tube shown in FIG. 17.
Figure 21:
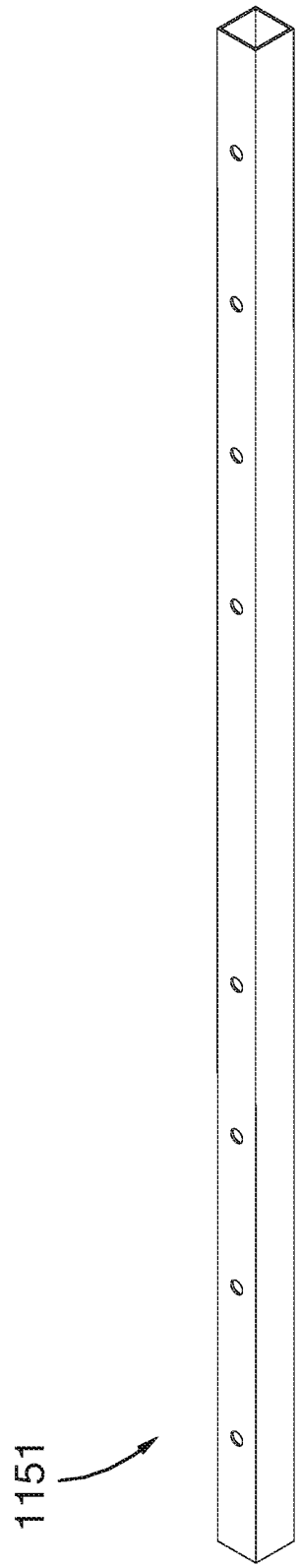
FIG. 21 is a rear perspective view of another central loading tube of a cross-member of the device shown in FIG. 4, in accordance with another embodiment.
Figure 22:
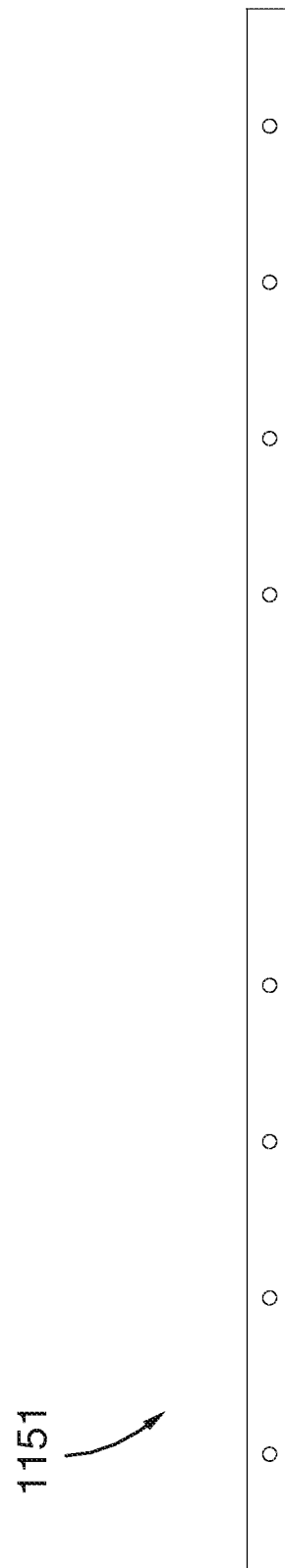
FIG. 22 is a rear elevation view of the central loading tube shown in FIG. 21.
Figure 23:
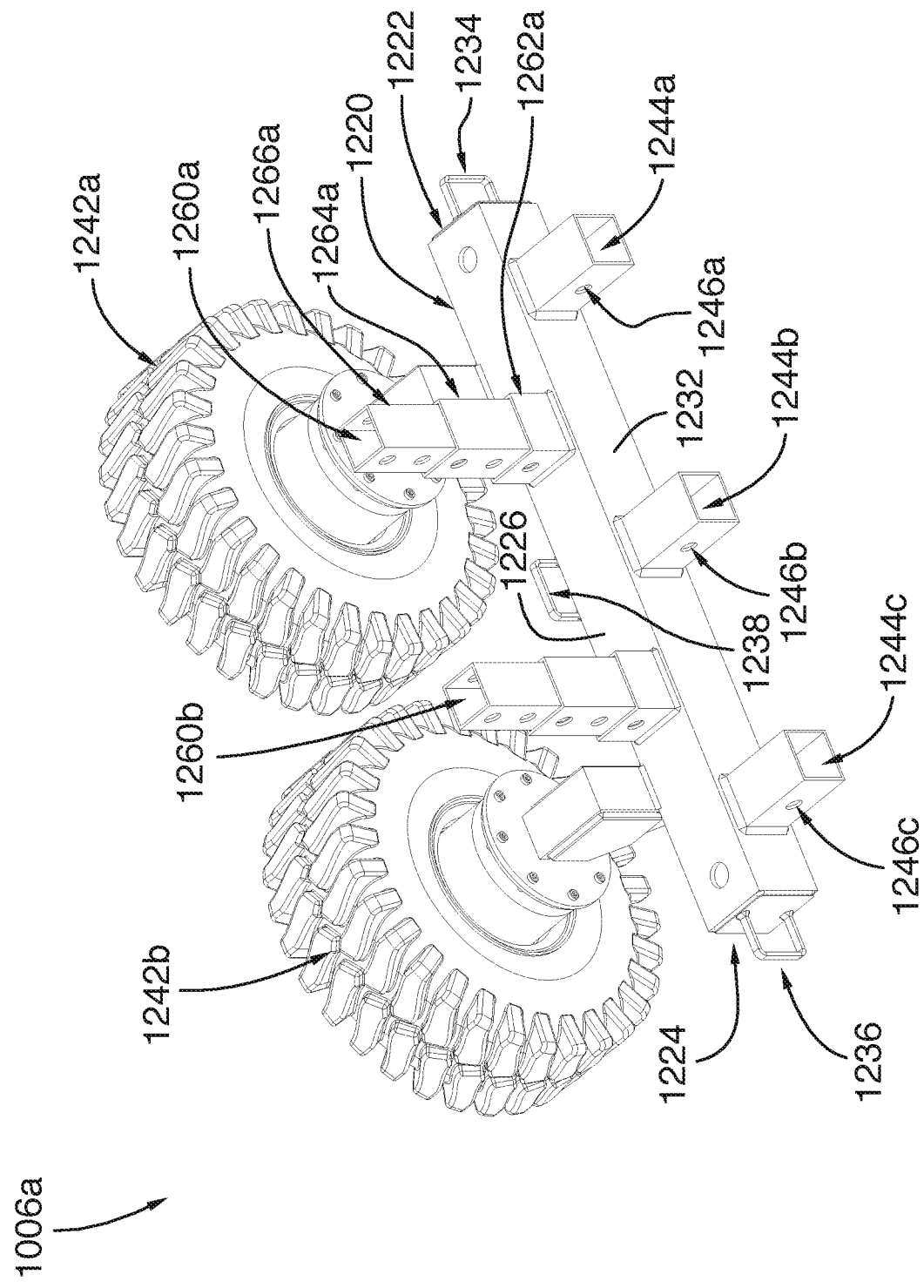
FIG. 23 is a rear right perspective view of a left side wheel assembly of the device shown in FIG. 4, in accordance with one embodiment.
Figure 24:
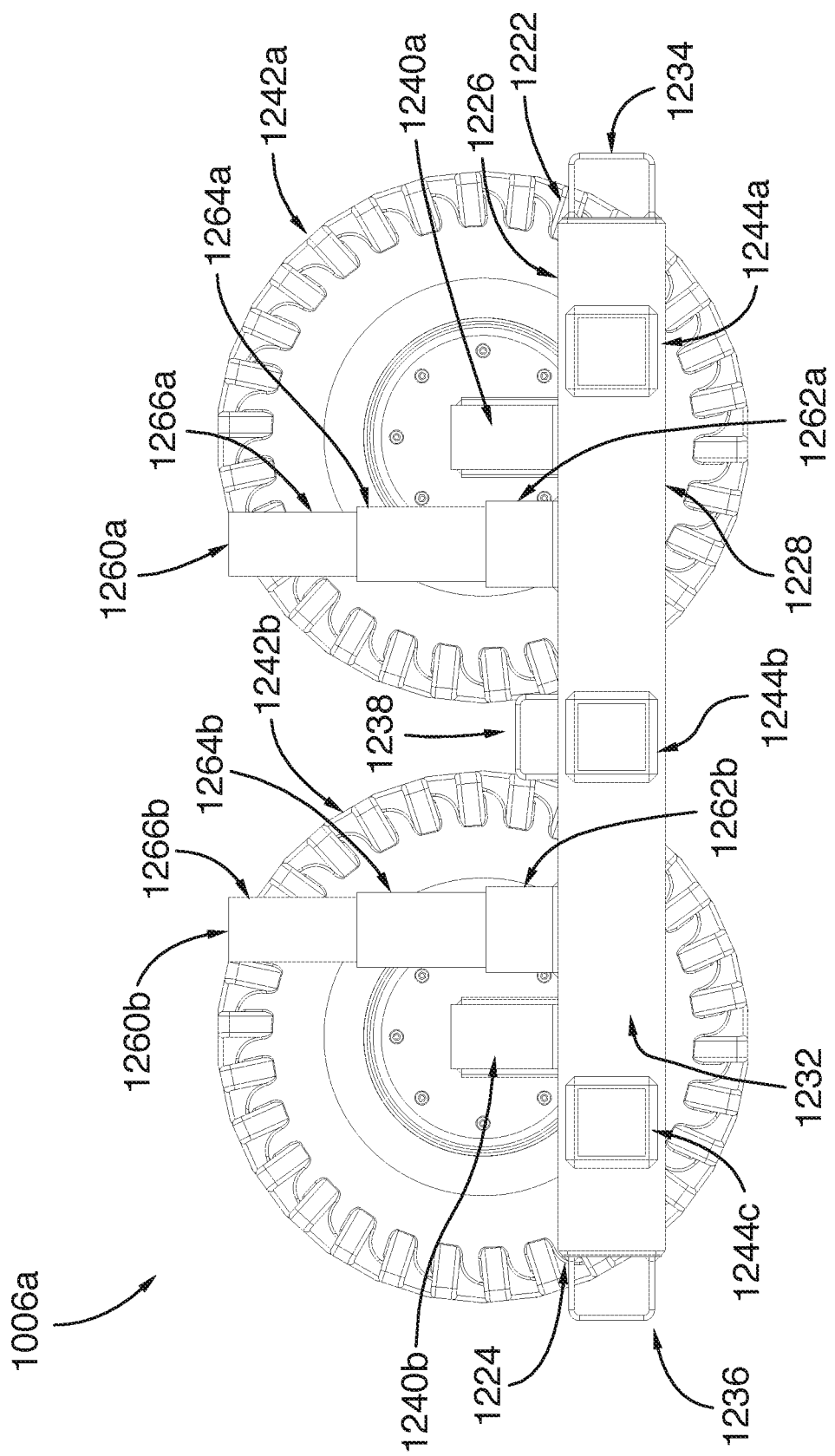
FIG. 24 is a right-side view of the side wheel assembly shown in FIG. 23.
Figure 25:
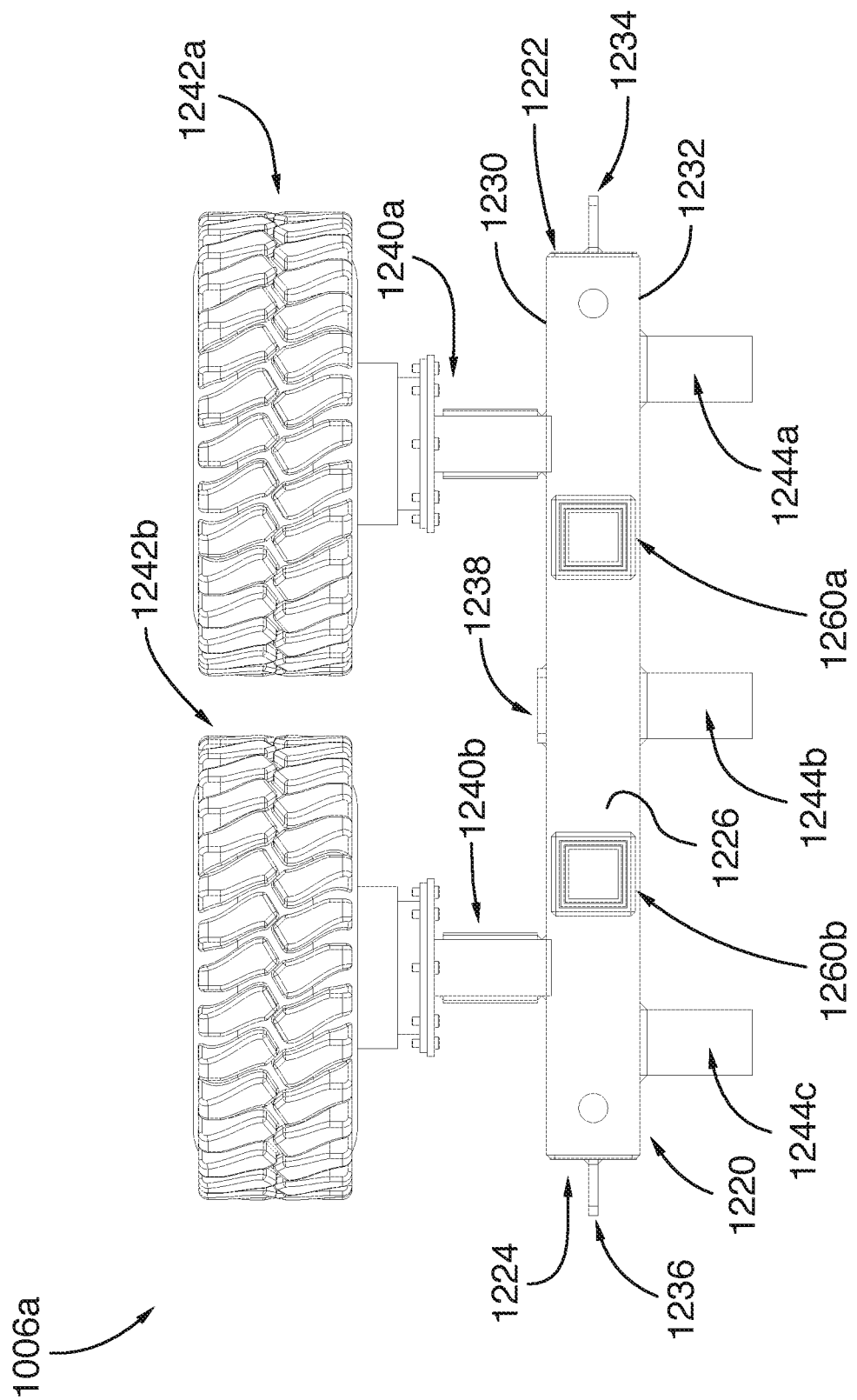
FIG. 25 is a top plan view of the side wheel assembly shown in FIG. 23.

A pair of downwardly projecting telescopic leg assemblies 122a, 122b are provided on the bottom face 112 of the frame member 105a, each telescopic leg assembly 122a, 122b supporting a corresponding wheel 124a, 124b. The telescopic leg assemblies 122a, 122b being essentially identical, only leg assembly 122b will be described, with reference to FIG. 3. It will be understood that a similar description also applies to leg assembly 122a. Leg assembly 122b comprises a sleeve portion 126 having a top end 128 secured to the bottom face 112 of the frame member 105, and a bottom end 130. In one embodiment, the sleeve portions 126 are HSS square tubes, 3/16"×4"×4", 8" long. Provided in the sleeve portions 126 are two pairs of holes 127a, 127b (only hole 127b being shown) for receiving a fastener 131 therein, in order to adjust the length of the telescopic leg assembly 122b, as it will be described in greater details below. Extending angularly between the sleeve portion 126 (generally halfway between the top end 128 and the bottom end 130) and the frame member 105 are diagonally extending bracing members 132, 133 for bracing or triangulating the sleeve portion 126 and provide enhanced sturdiness.

The telescopic leg assembly 122b also comprises an extendable portion 136 movably received in the corresponding sleeve portion 126. The extendable portion comprises a top end (not shown) received in the sleeve portion 126 and a bottom end 140, projecting outwardly from the sleeve portion 126 and equipped with a bearing assembly (not shown) for rotatably mounting the corresponding wheel 124b to the extendable portion 136. In one embodiment, the extendable portions are HSS square tubes, $\frac{3}{16}"\times 3\frac{1}{2}"\times 3\frac{1}{2}"$, 9" long. The extendable portion 136 also comprise various pairs of holes (not shown), allowing adjustment of the height of the wheel assembly 102a. More specifically, by adjusting the extendable portions 136 relative to their respective sleeve portions 126, and by positioning fasteners 131 in appropriate holes (e.g. holes 127a, 127b), it becomes possible to adjust the height of the frame member 105 relative to the ground.

For assembling the left and right wheel assemblies 102a, 102b to one another, telescopic cross-members 110a-110c are provided. The telescopic cross-members 110a-110c being identical to one another, only cross-member 110a will be described. It will be understood that a similar description also apples to telescopic cross-members 110b and 110c. In the illustrated embodiment, telescopic cross-member 110a comprises a central loading tube 150 and two side tubes 152, 154 partially received in the central loading tube 150 and movable relative thereto. More specifically, central loading tube 150 comprises a generally square body having a left end 158 and a right end 160. Defined between the left end 158 and the right end 160 are pairs of holes 170a-170e for receiving fasteners (not shown) therein. On one embodiment, central loading tube 150 is a HSS square tube, $\frac{3}{16}"\times 3\frac{1}{2}"\times 3\frac{1}{2}"$, 120" long, although it could have different size and shape.

Much like central loading tube 150, left and right side tubes 152, 154 are square tubes, but they are sized so as to be received in the body of the central loading tube 150, and to be movable inwardly and outwardly to modify the overall length of the telescopic cross-member 110a (and thus to modify the width of the moving device 100, as it will be described in greater details below). More specifically, left side tube 152 comprises a left end 184 for engaging the left frame member 105a and a right end 186 received in the body 156 of the central loading tube 150. Between its left and right ends 184, 186, the left side tube 152 is provided with a plurality of pairs aligned holes 196a-196e, for receiving therein a fastener (not shown). Likewise, right side tube 154 comprises a left end 201 received in the central loading tube 150 and a right end 203 for engaging the right frame member 105b. Between its left and right ends 201, 203, the right side tube 154 is provided with a plurality of holes 212a-212e, for receiving therein a fastener (not shown). In one embodiment, each of the left and right side tubes 152, 154 is a HSS square tube, $\frac{3}{16}"\times 3"\times 3"$, 66" long. While in the illustrated embodiment, the left and right side tubes 152, 154 are received in the central loading tube 150, it will be understood that left and right side tubes 152, 154 could be sized bigger than central loading tube 150, and the left end 158 and right end 160 of the central loading tube 150 be received in left and right side tubes 152, 154. Further, tube shapes other that square tube shape would be possible without departing from the scope of the embodiment.

To assemble the telescopic cross-member 110a, the right end 186 of the left side tube 152 is positioned inside the central loading tube 150. Likewise, the left end 201 of the right side tube 154 is positioned inside the central loading tube 150. At that point, the left and right side tubes 152, 154 can be slide inside the central loading tube 150 until a desired cross-member 110a length is reached, and one pair of holes of each of the left and right side tubes 152, 154 (e.g. holes 196a-196e and 212a-212e) is in a horizontal alignment with a corresponding pair of holes 170a-170e of the central loading tube 150. At that point, a fastener such as a pin or a bolt (not shown) can be inserted into the holes 196a-196e, 212a-212e and 170a-170d of the left and right side tubes 152, 154 and central loading tube 150, to maintain their position relative to one another. To further adjust the length of the telescopic cross-member 110a, the fasteners (not shown) are removed, the left and right side tubes 152, 154 are repositioned relative to the central loading tube 150, and the fasteners (not shown) are repositioned back in proper holes 196a-196e, 212a-212e and 170a-170e.

While in the illustrated embodiment, the telescopic cross-members are provided with holes 196a-196e, 212a-212e and 170a-170e, it will be understood that they could be provided with a different number of holes for receiving fasteners, or no holes at all, without departing from the scope of the embodiment. Further, instead of fasteners such as pins or bolts working in collaborations with holes 196a-196e, 212a-212e and 170a-170e, a different system for locking the left and right tubes 152, 154 to the central loading tube 150, for instance a locking mechanism relying on frictional engagement.

Having described the various components of the moving device 100, its assembly will now be described. In one embodiment, the left and right wheel assemblies 102a, 102b, the and the telescopic cross-members 110a-110c are first provided and they can be roughly positioned on-site, to pursue further assembly of the moving devices 100 in the general area in which it is intended to be used. At that point, the length of the telescopic cross-members 110a-110c can be adjusted by sliding the left and right side tubes 152, 154 relative to their respective central loading tubes 150, and position the fasteners 172, 174 in proper holes 196a-196e, 212a-212e and 170a-170e, in order to reach the desired length. The telescopic cross-members 110a-110c are then assembled to wheel assemblies 102a, 102b. To do so, the left ends 184 of the left side tubes 152 of the telescopic cross-members 110a-110c are engaged in corresponding slots 120a-120c provided on the left frame member 105a, and fasteners (not shown) are optionally engaged in holes (not shown) defined in frame member 105a and left side tubes 152 to maintain the left side tube 152 in position relative to the frame member 105a. In a similar manner, the right ends 203 of the right side tubes 154 of the telescopic cross-members 110a-110c are engaged in corresponding slots 120a-120c provided on the right frame member 105b, and fasteners (not shown) are optionally engaged in the holes (not shown) defined in frame member 105b and right side tubes 154, at which point the moving device 100 is ready to be used to transport building module 10. Once the moving device 100 is no longer needed, it can be disassembled in the opposite order. Although the assembly of the moving device 100 is described in accordance with one exemplary assembly method or sequence, it will be understood that the various components of the moving device 100 can be assembled in a different order without departing from the scope of the embodiment.

In one embodiment, the device 100 may comprise an additional beam or shaft (not shown) operatively connected to the wheel assemblies 102a, 102b and or to one or multiple cross-members 104a-104c to allow an operator to pull, push and turn the device 100 and displace the building module 10 supported thereon. In one embodiment, the wheel assemblies 102a, 102b and the wheels 124a, 124b attached thereto are configured to stay parallel to frame members 105a, 105b and perpendicular to cross-members 104a-104c. Alternatively, in other embodiments, the wheel assemblies 102a, 102b or the wheels 124a, 124b attached thereto may be configured to turn relative to the frame members 105a, 105b or relative to the cross-members 104a-104b, to allow steering of the device 100. In one embodiment, the wheel assemblies 102a, 102b or the wheels 124a, 124b may turn in response to input from an operator. For example, the operator may turn a steering rod (not shown) to adjust the angle of the wheels 124a, 124b relative to the frame members 105a, 105b for steering the device 100.

Turning now to FIGS. 4 to 30, another embodiment of a moving device 1000 will now be described. In this embodiment, and referring to FIGS. 4 to 8, the moving device 1000 comprises a pair of spaced-apart frame members 1002a, 1002b extending parallel to one another, a plurality of telescopic cross-members 1004a-1004c removably mounted to the frame members 1002a, 1002b and extending therebetween, a pair of left and right wheel assemblies 1006a, 1006b mounted underneath and supporting frame members 1002a, 1002b, and a central wheel assembly 1008, removably mounted underneath the telescopic cross-members 1004a-1004c and supporting the same, as it will be described in greater details below.

Referring more specifically to FIGS. 9 to 12, the frame members 1002a, 1002b will now be described. Frame members 1002a, 1002b being mirror images of one another, only frame member 1002a will be described. It will be appreciated that a similar description also applies to frame member 1002b, with proper adaptation.

Frame member 1002a includes a body 1110 having a generally square cross-section (e.g. a HSS tube, ⅜"×5"×5", 48" long) and having a front end 1112 and a read end 1114, as well as top, bottom, left and right faces 1116, 1118, 1120 and 1122, respectively. Provided at the front and rear ends 1112, 1114 are U-shaped handles 1124, 1126, to assist a user in moving the frame member 1002a, whether at the time of assembly of the moving device 1000 or to position the assembled moving device 1000 underneath a building module 10 or structure, as it will become apparent below. Frame member 1002a is also provided with two pairs of vertically aligned holes 1003a and 1003b.

Extending sidewardly from the right face 1122 of the body 1110, frame member 1002a is provided with a plurality of sleeves 1128a-1128c sized and shaped to removably receive a portion of the cross-members 1004a-1004c, as it will become apparent below. In one embodiment, the sleeves 1128a-1128c are HSS square tubes ³⁄₁₆"×3½"×3½", 6" long, but it will be understood that they could be shaped and sized differently. Defined in each of the sleeves 1128a-1128c is a pair of horizontally aligned holes 1130a, 1130b and 1130c for receiving therein corresponding fastener 1132a-1132c (best shown in FIG. 4) for securing a corresponding cross-member 1004a-1004c in each of the sleeves 1128a-1128c.

Extending downwardly from the bottom face 1118 is a pair of legs 1134a, 1134b receivable in a portion of the right wheel assembly 1006 for securing the frame member 1002a to the right wheel assembly 1002, as it will become apparent below. In one embodiment, each of the legs 1134a, 1134b comprises a top end 1136 secured to the bottom face 1118, a bottom end 1138, and three pairs of horizontally aligned holes 1140a, 1140b, 1140c for receiving therein fasteners 1142, 1143 (best shown in FIG. 5). In one embodiment, the legs 1134a, 1134b are made of HSS square tubes, ¼"×2½"×2½", 9" long, although it will be appreciated that legs 1134a, 1134b could be sized, shaped or configured differently without departing from the scope of this embodiment. In one embodiment, the sleeves 1128a-1128c and legs 1134a, 1134c are welded to the body 1110 of the frame member 1002a but it will be understood that they could be secured differently. For instance, they could be configured to be threaded in the body 1110 be secured using rivets, bolts and nuts or otherwise, without departing from the scope of the embodiment.

Cross-members 1004a-1004c being identical to one another, only cross-member 1002a will be described. It will be appreciated that a similar description also applies to cross-members 1004b and 1004c, with proper adaptation. With reference to FIGS. 4, 5 and 13 to 22, telescopic cross-member 1004a comprises a central loading tube 1150 and two side tubes 1152, 1154 partially received in the central loading tube 1150 and movable relative thereto. More specifically, central loading tube 1150, best shown in FIGS. 13 to 16, comprises a generally square body having a left end 1158, a right end 1160, and top, bottom, front and rear faces 1162, 1164, 1166 and 1168. Defined between the left end 1158 and the right end 1160 are horizontally aligned pairs of holes 1170a-1170h for receiving fasteners 1172, 1174 therein (best shown in FIG. 5). On one embodiment, central loading tube 1150 is a HSS square tube, ³⁄₁₆"×3½"× 3½", 120" long, although it could have different size and shape. Extending downwardly from the bottom face 1164 of the square body 1156, halfway between the left end 1158 and the right end 1160 is a central leg 1176 configured for engaging the central wheel assembly 1008, as it will become apparent below. The central leg 1176 comprises a top end 1178 fixedly secured to the bottom face 1164 of the square body 1156 and a bottom end 1180. In one embodiment, the central leg 1176 is a vertically positioned HSS square tube, ¼"×2½"×2½", 9" long. Defined between the top end 1178 and the bottom end 1180 of the central leg 1176 are a plurality of pairs of horizontally aligned holes 1182a-1182c, allowing vertical adjustment of the height of the telescopic cross-member 1004a relative to the central wheel assembly 1008, as it will become apparent below.

Much like central loading tube 1150, left and right side tubes 1152, 1154 are square tubes, but they are sized so as to be received in the square body 1156 of the central loading tube, and to be movable inwardly and outwardly to modify the overall length of the telescopic cross-member 1004a (and thus to modify the width of the moving device 1000, as it will be described in greater details below). More specifically, left side tube 1152 comprises a left end 1184 for engaging the left frame member 1002a, a right end 1186 received in the body of the central loading tube 1150, as well as top, bottom, front and rear faces 1188, 1190, 1192, 1194. Between its left and right ends 1184, 1186, the left side tube 1152 is provided with a plurality of pairs of horizontally aligned holes 1196a-1196f, for receiving therein fastener 1172. Likewise, right side tube 1154, which is identical to left side tube 1152 comprises a left end 1200 received in the body 1156 of the central loading tube 1150, a right end 1202 for engaging the right frame member 1002b (see FIG. 5), as well as top, bottom, front and rear faces. Between its left and right ends 1200, 1202, the right side tube 1154 is provided with a plurality of pairs of vertically aligned holes 1212*a*-1212*f* (only holes 1212*c*-1212*f* being shown, in FIG. 5), for receiving therein fastener 1174. In one embodiment, each of the left and right side tubes 1152, 1154 is a HSS square tube, ³⁄₁₆"×3"×3", 66" long.

To assemble the telescopic cross-member 1004*a*, the right end 1186 of the left side tube 1152 is positioned inside the body 1156 of the central loading tube 1150. Likewise, the left end 1200 of the right side tube 1154 is positioned inside the body 1156 of the central loading tube 1150. At that point, the left and right side tubes 1152, 1154 can be slide inside the body 1156 of the central loading tube 1150 until a desired cross-member 1004*a* length is reached, and one pair of holes 1196*a*-1196*f* and 1212*a*-1212*f* of each of the left and right side tubes 1152, 1154 is horizontal alignment with a corresponding pair of holes 1170*a*-1170*h* of the central loading tube 1150. At that point, a fastener 1172, 1174 such as a pin can be inserted into the holes 1196*a*-1196*f*, 1212*a*-1212*f* and 1170*a*-1170*h* of the left and right side tubes 1152, 1154 and central loading tube 1150, to maintain their position relative to one another. To further adjust the length of the telescopic cross-member 1004*a*, the fasteners 1172, 1174 are removed, the left and right side tubes 1152, 1154 are repositioned relative to the central loading tube 1150, and the fasteners 1172, 1174 are repositioned back in proper holes 1196*a*-1196*f*, 1212*a*-1212*f* and 1170*a*-1170*h*.

In an alternate embodiment, cross-members 1004*a*-1004*c* could be replaced with cross-members having a central loading tube that has no central leg. For instance, cross-members 1004*a*-1004*c* could include central loading tube 1151 instead of central loading tube 1150. As can be noted from FIGS. 21 and 22, central loading tube 1151 is identical to central loading tube 1150, with the exception that it includes no central leg. As such, in one embodiment, central loading tube 1151 is a HSS square tube, ³⁄₁₆"×3½"×3½", 120" long. As it will be appreciated, the used of central loading tube 1151 may be suitable in instances where the width of the module to be moved is more reduced and/or the load of the building module 10 to be transported is reduced and the use of central wheel assembly 1008 is not required. As it will be appreciated, other configurations are also possible. For instance, instead of using a single central wheel assembly 1008, it could be decided to use two or more central wheel assemblies. In such a case, the central loading tube (e.g. central loading tube 1150) could be equipped with a corresponding number of downwardly extending legs similar to leg 1175 of central loading tube 1150.

Now referring to FIGS. 23 to 26, the left and right wheel assemblies 1006*a*, 1006*b* will be described. Left and right wheel assemblies 1006*a*, 1006*b* being identical, only left wheel assembly 1006*a* will be described. It will be appreciated that a similar description also applies to right wheel assembly 1006*b*, with proper adaptation.

In the illustrated embodiment, left wheel assembly 1006*a* comprises a longitudinal frame member 1220 having a front end 1222, a rear end 1224, as well as top, bottom, left and right faces 1226, 1228, 1230 and 1232. In one embodiment, the longitudinal frame member 1220 is a HSS square tube, ⅜"×5"×5", 48" long. Provided at the front and rear ends 1222, 1224 as well as generally halfway between the front end 1222 and the rear end 1224, are handles 1234, 1236 and 1238 for assisting a user in maneuvering the left wheel assembly 1006*a*, whether for the assembly of the moving device 1000 or after its assembly, for positioning underneath the building module 10 to be moved.

Figure 26:
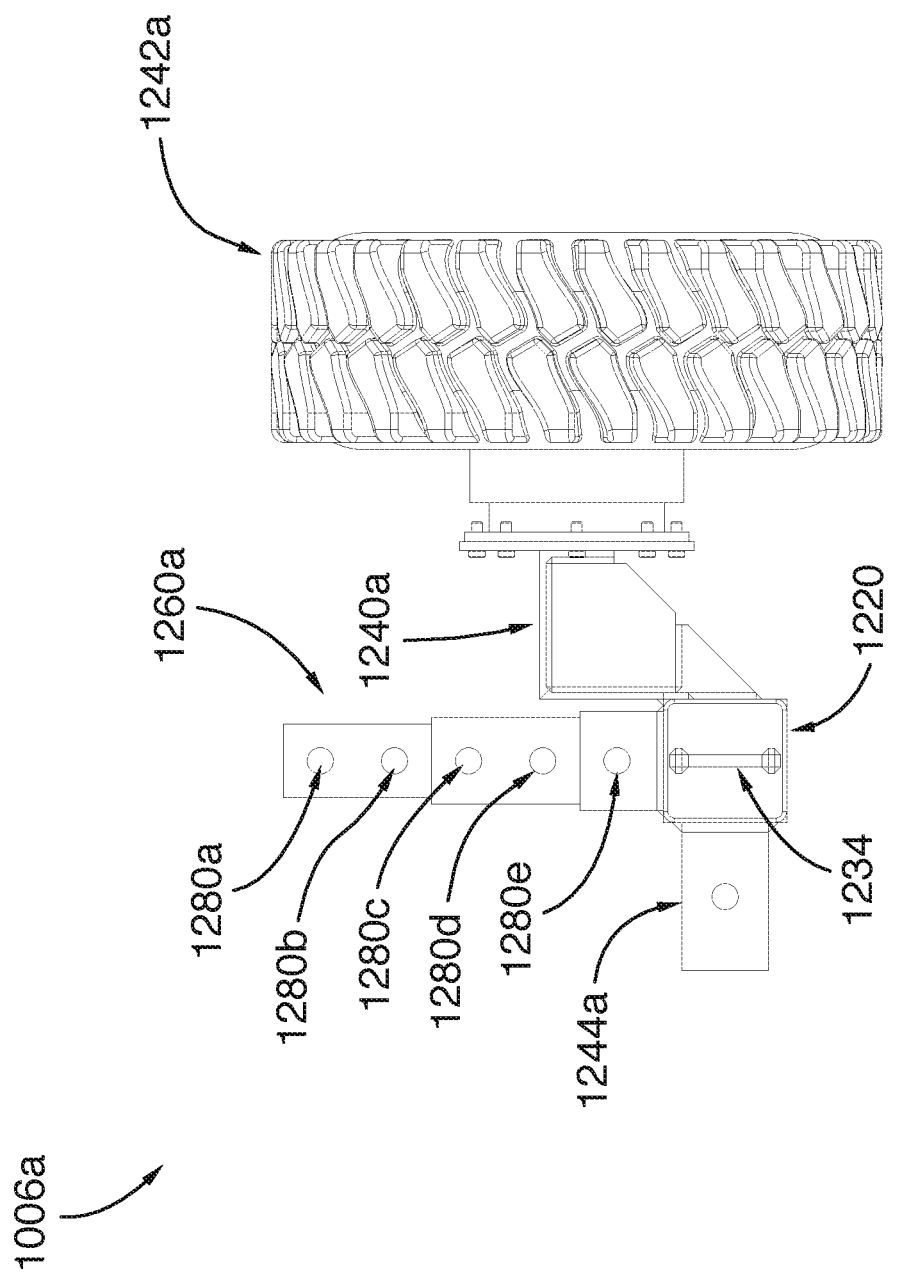
FIG. 26 is a front elevation view of the side wheel assembly shown in FIG. 23.
Figure 27:
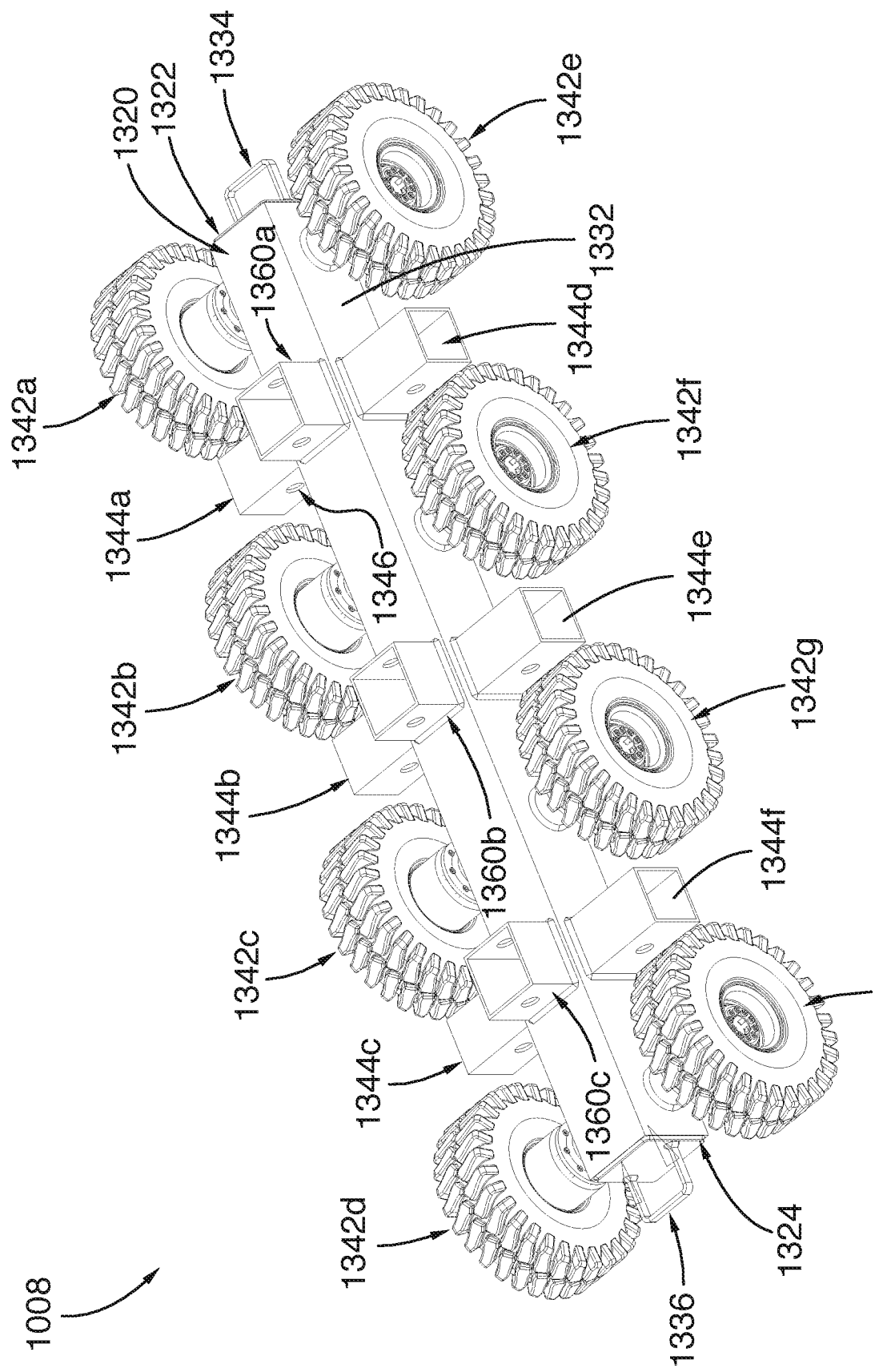
FIG. 27 is a rear right perspective view of a central wheel assembly of the device shown in FIG. 4, in accordance with one embodiment.
Figure 28:
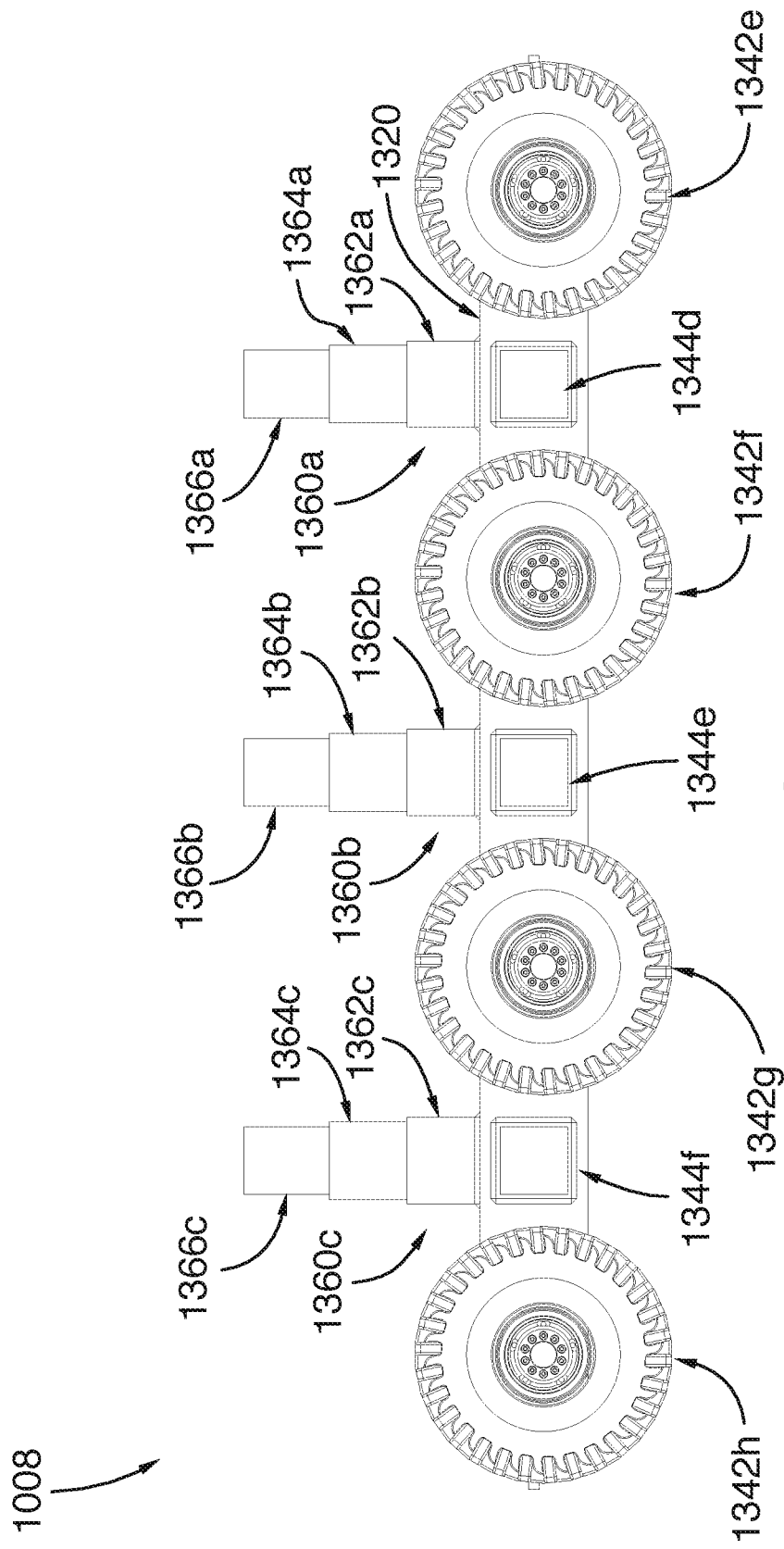
FIG. 28 is a right-side view of the central wheel assembly shown in FIG. 27.
Figure 29:
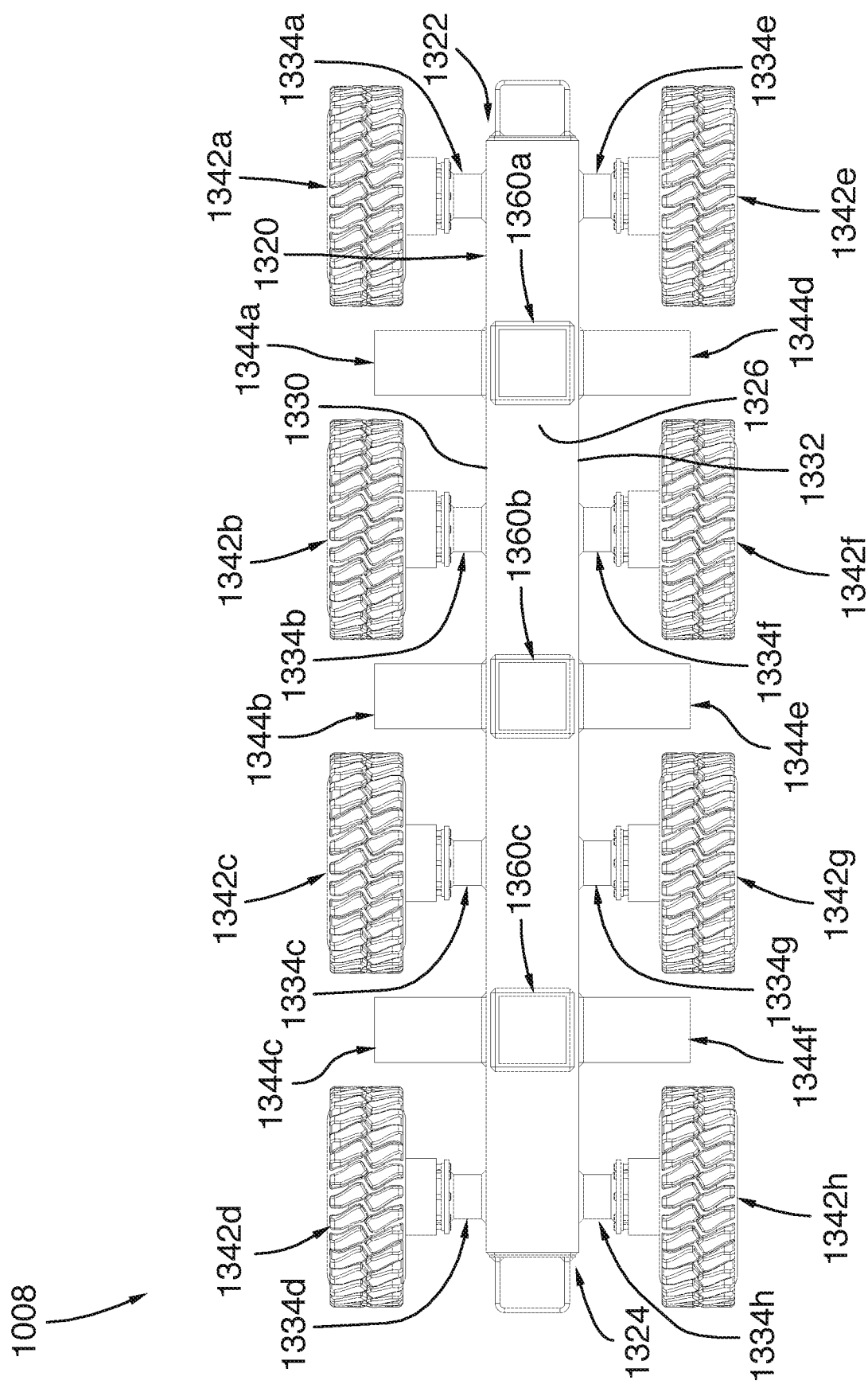
FIG. 29 is a top plan view of the central wheel assembly shown in FIG. 27.
Figure 30:
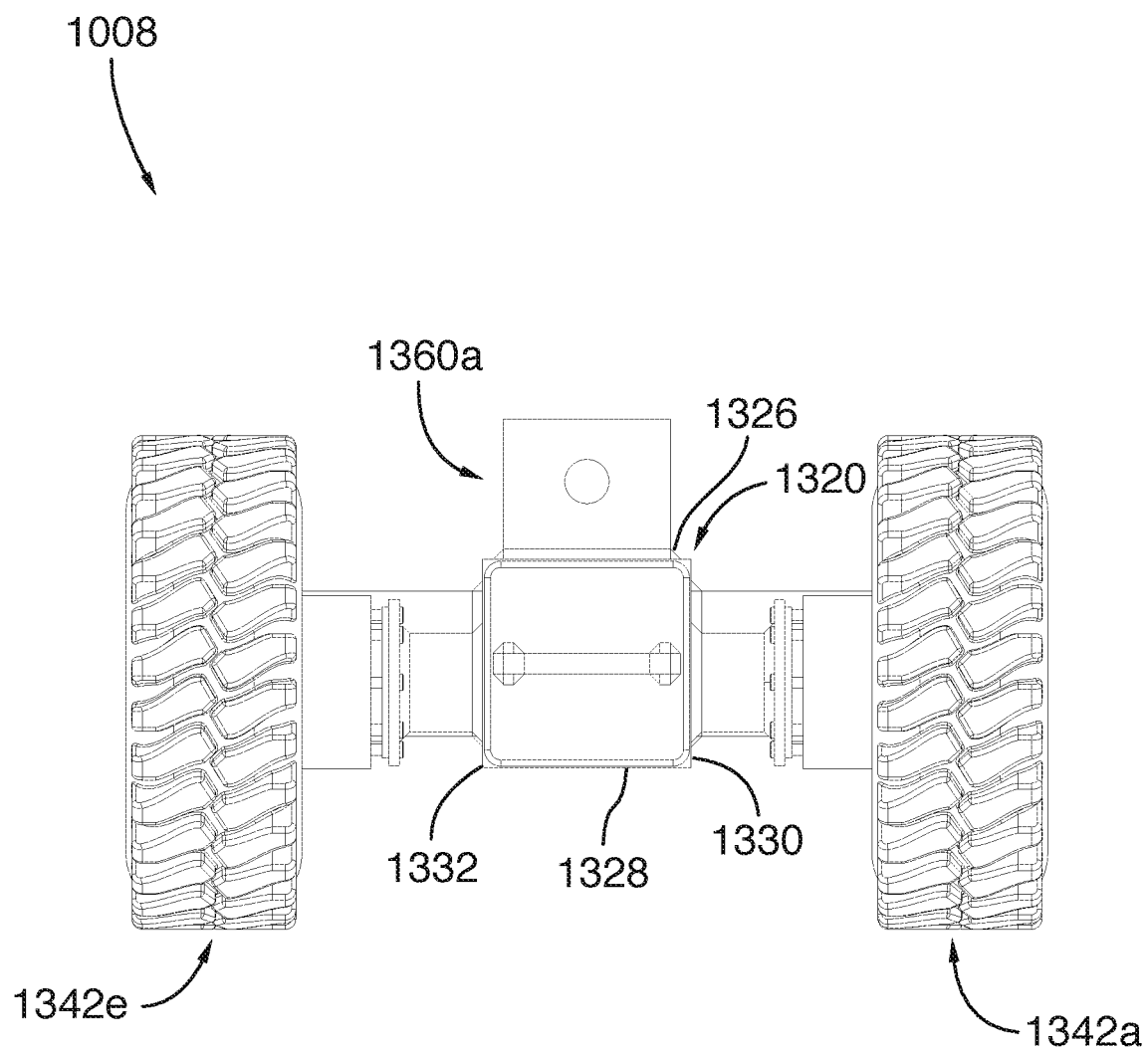
FIG. 30 is a front elevation view of the central wheel assembly shown in FIG. 27.

Extending from the left face 1230 of the longitudinal frame member 1220, upwardly and toward the left, is a pair of wheel mounts 1240*a*, 1240*b* and a corresponding pair of wheel 1242*a*, 1242*b* rotatably mounted to the wheel mounts 1240*a*, 1240*b*. As it will be appreciated, and as best shown in FIG. 26, the fact that the wheel mounts 1240*a*, 1240*b* extend upwardly and above the longitudinal frame member 1220 allows the positioning of the rotation axis of the wheels 1242*a*, 1242*b* above the longitudinal frame member 1220, which in turn allows for providing the left wheel assembly 1006*a* with bigger and sturdier wheels 1242*a*, 1242*b*. In one embodiment, the wheels 1242*a*, 1242*b* are 24" diameter wheels, but it will be understood that other size of wheels could also be suitable without departing from the scope of this embodiment.

Extending from the right face 1232 of the longitudinal frame members 1220 are sleeves 1244*a*-1244*c*. Much like sleeves 1128*a*-1128 of frame member 1002*a*, sleeves 1244*a*-1244*c* are sized and shaped to removably receive a portion of the cross-members 1004*a*-1004*c* (or similar cross-members), as it will become apparent below. Thus, in one embodiment, the sleeves 1244*a*-1244*c* are HSS square tube having the following dimensions ³⁄₁₆"×3½"×3½", 6" long, but it will be understood that they could be shaped and sized differently. Defined in each of the sleeves 1244*a*-1244*c* is a pair of horizontally aligned holes 1246*a*, 1246*b*, 1246*c* for receiving therein corresponding fasteners (not shown) for securing a corresponding cross-member (e.g. cross-members 1004*a*-1004*c* or similar cross-members) in each of the sleeves 1244*a*-1244*c*.

Provided on the top face 1226 of the longitudinal frame member 1220, and extending upwardly, is a pair of telescopic upright members 1260*a*, 1260*b*, sized, shaped and positioned to engage the legs 1134*a*, 1134*b* of the frame member 1002*a*. More specifically, in the illustrated embodiment, each of the telescopic upright member 1260*a*, 1260*b* comprises a lower sleeve portion 1262*a*, 1262*b*, an intermediate portion 1264*a*, 1264*b* slidably receive in the lower sleeve portion 1262*a*, 1262*b*, and an upper portion 1266*a*, 1266*b* slidably received in the intermediate portion 1264*a*, 1264*b*, and configured to slidably receive therein a corresponding leg 1134*a* or 1134*b* of frame member 1002*a*.

In one embodiment, the lower sleeve portion 1262*a* or 1262*b* is HSS square tube, ³⁄₁₆"×4"×4", 8" long, the intermediate portion 1264*a* or 1264*b* is HSS square tube, ³⁄₁₆"×3½"×3½", 9" long and the upper portion 1266*a* or 1266*b* is HSS square tube, ³⁄₁₆"×3"×3", 9" long, while legs 1134*a*, 1134*b* of frame member 1002*a* are HSS square tube, ¼"×2½"×2½", 9" long. Much like legs 1134*a*, 1134*b* of frame member 1002*a*, the lower sleeve portions 1262*a*, 1262*b*, intermediate portions 1264*a*, 1264*b* and upper portions 1266*a*,1266*b* of the telescopic upright members 1260*a*, 1260*b* are provided with a plurality of vertically aligned holes 1280*a*-12802, configured for receiving therein fasteners 1142, 1143 or 1282*a*-1282*b* such as a pin. By adjusting the position of the various portions of the telescopic upright members 1260*a*, 1260*b* and of the legs 1134*a*, 1134*b*, and by positioning the fasteners 1282*a*-1282*c* in the various pairs of holes 1280*a*-1280*e*, the distance of the frame member 1002*a* relative to the longitudinal frame member 1220 (and thus the height of the frame member relative to the ground) can be adjusted.

As stated above, in this embodiment, the moving device 1000 is provided with the central wheel assembly 1008. The central wheel assembly 1008 is configured to engage and provide support to the telescopic cross-members 1004*a*-1004*c*, to provide additional rigidity to the moving device when transporting a building module 10. In the illustrated embodiment, the central wheel assembly 1008 comprises a longitudinal frame member 1320 having a front end 1322, a rear end 1324, as well as top, bottom, left and right faces 1326, 1328, 1330 and 1332. In one embodiment, the longitudinal frame member 1320 is a HSS square tube, ⅜"×5"× 5", 48" long. Provided at the front and rear ends 1322, 1324 are handles 1334 and 1336 for assisting a user in maneuvering the central wheel assembly 1008, whether for the assembly of the moving device 1000 or after its assembly, for positioning underneath the building module 10 to be moved.

Extending from the left and right faces 1330 and 1332 of the longitudinal frame member 1320, are a plurality of wheel mounts 1340a-1340h, and a corresponding plurality of wheel 1342a-1342h rotatably mounted to the wheel mounts 1340a-1340h. As it will be appreciated. In one embodiment, the wheels 1342a-1342h are 12" diameter wheels, but it will be understood that other size of wheels could also be suitable without departing from the scope of this embodiment.

Also extending from the left and right faces 1330 and 1332 of the longitudinal frame members 1320, between the various pairs of adjacent wheels 1342a-1342h are sleeves 1344a-1344f. Much like sleeves 1128a-1128 of frame member 1002a, sleeves 1344a-1344f are sized and shaped to removably receive a portion of the cross-members 1004a-1004c (or similar cross-members), as it will become apparent below. Thus, in one embodiment, the sleeves 1344a-1344f are HSS square tube having the following dimensions 3/16"×3½"×3½", 6" long, but it will be understood that they could be shaped and sized differently. Defined in each of the sleeves 1344a-1344f is a pair of horizontally aligned holes (only hole 1346a being shown) for receiving therein corresponding fastener (not shown) for securing a corresponding cross-member (e.g. cross-members 1004a-1004c or similar cross-members) in each of the sleeves 1344a-1344f.

Provided on the top face 1326 of the longitudinal frame member 1320, and extending upwardly, are three telescopic upright members 1360a-1360c, sized, shaped and positioned to engage the central legs 1176 of the telescopic cross-members 1004a-1004c, and having a configuration similar to upright members 1260a, 1260b of side wheel assemblies 1006a, 1006b. More specifically, in the illustrated embodiment, each of the telescopic upright member 1360a-1360c comprises a lower sleeve portion 1362a-1362c, an intermediate portion 1364a-1364c slidably receive in the lower sleeve portion 1362a-1362c, and an upper portion 1366a-1366c slidably received in the intermediate portion 1364a-1364c, and configured to slidably receive therein a corresponding central leg 1176 of a telescopic cross-member 1004a-1004c.

In one embodiment, the lower sleeve portions 1362a-1362c are HSS square tubes, 3/16"×4"×4", 8" long, the intermediate portions 1364a-1364c are HSS square tubes, 3/16"×3½"×3½", 9" long and the upper portions 1366a-1366c are HSS square tubes, 3/16"×3"×3", 9" long, while central legs 1176 of telescopic cross-members 1004a-1004c are HSS square tubes, ¼"×2½"×2½", 9" long. Much like central legs 1176 of frame telescopic cross-members 1004a-1004c, the lower sleeve portions 1362a-1362c, intermediate portions 1364a-1364c and upper portions 1366a-1366c of the telescopic upright members 1360a-1360c are provided with a plurality of vertically aligned pairs of holes (not shown in FIG. 28), configured for receiving therein fastener 1382a-1382d such as pins. By adjusting the position of the various portions of the telescopic upright members 1360a-1360c and of the central legs 1176, and by positioning the fasteners 1382a-1382d in the various pairs of holes (not shown in FIG. 28) the distance of the longitudinal frame member 1320 relative to the telescopic cross-members 1004a-1004c (and thus the height of the telescopic cross-members 1004a-1004c relative to the ground) can be adjusted.

Having described the various components of the moving device 1000, its assembly will now be described. In one embodiment, the left and right wheel assemblies 1006a, 1006b, the frame members 1002a, 1002b and the telescopic cross-members 1004a-1004c are first provided. In a first step, the left frame member 1002a is mounted to the left wheel assembly 1006a, by engaging the legs 1134a, 1134b of the left frame member 1002a into correspond upper portions 1266a, 1266b of the telescopic upright members 1260a, 1260b of the left wheel assembly 1006a. At that point, the fasteners 1142,1143 (e.g. pins) are positioned in selected holes 1280a-1280e of the telescopic upright members 1260a, 1260b and 1140a-1140c of the legs 1134a, 1134b to set the frame member 1002a at a desired distance relative to the wheel assembly 1006a. Likewise, the right frame member 1002b is mounted to the right wheel assembly 1006b, by engaging the legs 1134a, 1134b of the right frame member 1002b into correspond upper portions 1266a, 1266b of the telescopic upright members 1260a, 1260b of the right wheel assembly 1006a. At that point, the fasteners 1142, 1143 (e.g. pins) are positioned in selected holes 1280a-1280e of the telescopic upright members 1260a, 1260b and 1140a-1140c of the legs 1134a, 1134b to set the frame member 1002b at a desired distance relative to the wheel assembly 1006b. Once the frame members 1002a, 1002b are assembled with their respective wheel assemblies, they can be roughly positioned on-site, to pursue further assembly of the moving devices 1000 in the general area in which it is intended to be used. At that point, the length of the telescopic cross-members 1004a-1004c can be adjusted by sliding the left and right side tubes 1152, 1154 relative to their respective central loading tubes 1150, and by positioning the fasteners 1172, 1174 in proper holes 1170a-1170h and 1196a-1196f, in order to reach the desired length.

The telescopic cross-members 1004a-1004c are then assembled to the frame members 1002a,1002b, and to the left and right wheel assemblies 1006a, 1006b attached thereto. To do so, the left ends 1184 of the left side tubes 1152 of the telescopic cross-members 1004a-1004c are engaged in corresponding sleeves 1128a-1128c provided on the left frame member 1002a, and the fasteners 1132a-1132c are engaged in the holes 1130a-1130 defined in the sleeves and 1196a of the left side tube 1152. In a similar manner, the right ends 1186 of the right side tubes 1154 of the telescopic cross-members 1004a-1004c are engaged in corresponding sleeves 1128a-1128c provided on the right frame member 1002b, and the fasteners 1132a-1132c are engaged in the holes 1130a-1130c defined in the sleeves 1128a-1128c and 1196f of the right side tube 1154. In some instances where the distance separating the left and right wheel assemblies 1006a, 1006b is relatively small, and the telescopic cross-members 1004a-1004c are consequently relatively short, the moving device 1000 may be in a state where it can be used, especially if the load to be moved is relatively light. In other words, the moving device can be used without the central wheel assembly 1008, which may result in opting for telescopic cross-members 1004a-1104c equipped with central loading tube 1151 rather than central loading tube 1150. In other instances, however, where the distance spanning between the two wheel assemblies 1006a and 1006b is greater, and the telescopic cross-members 1004a-1104c are expanded, it may be advantageous to provide further support the center of the telescopic cross-members 1004a-1004c to reduce unwanted bending thereof, especially if the load is relatively heavy. In such a case, the central wheel assembly is moved under the central loading tubes 1150 of the cross-members 1004a-1004c, in alignment with the central legs 1176 projecting downwardly. When the central wheel assembly 1008 is properly positioned, the telescopic upright members 1360a-160c of the central wheel assembly 1008 can be set to engage the legs 1176 of the telescopic cross-members 1004a-1004c, at which point the fasteners 1382a-1382d can be positioned in the appropriate holes for securing the central wheel assembly 1008 to the cross-members 1004a-1004c, at which point the moving device 1000 is ready to be used to transport building module 10. Once the moving device 1000 is no longer needed, it can be disassembled in the opposite order. Although the assembly of the moving device 1000 is described in accordance with one exemplary assembly method or sequence, it will be understood that the various components of the moving device 1000 can be assembled in a different order without departing from the scope of the embodiment.

In one embodiment, the device 1100 may comprise an additional beam or shaft (not shown) operatively connected to the wheel assemblies 1006a, 1106b and or to one or multiple cross-members 1004a-1004c to allow an operator to pull, push and turn the device 100 and displace the building module 10 supported thereon. In one embodiment, the wheel assemblies 1006a, 1006b and the wheels 1242a, 1242b attached thereto are configured to stay parallel to frame members 1002a, 1002b and perpendicular to cross-members 1004a-1004c. Alternatively, in other embodiments, the wheel assemblies 1006a, 1006b or the wheels 1242a, 1242b attached thereto may be configured to turn relative to the frame members 1002a, 1002b or relative to the cross-members 1004a-1004b, to allow steering of the device 100. In one embodiment, the wheel assemblies 1006a, 1006b or the wheels 1242a, 1242b may turn in response to input from an operator. For example, the operator may turn a steering rod (not shown) to adjust the angle of the wheels 1242a, 1242b relative to the frame members 1002a, 1002b for steering the device 100.

In one embodiment, when the clearance on the ground allows it, further cross-members (not shown) can be used to link the side wheel assemblies 1006a, 1006b either directly to one another (when no central wheel assembly 1008 is used) or to the central wheel assembly 1008. More specifically, cross-members similar to cross-members 1004a-1004c, or shorter versions thereof, can be positioned in sleeves 1244a-1244c of the left and right wheel assemblies 1006a, 1006b and sleeves 1344a-1344c of the central wheel assembly 1008, and secured thereto using fasteners such as pins or nuts and bolts, as described above in connection with cross-members 1004a-1004c.

As it will be appreciated, the fact that the moving device 1000 can be assembled and disassembled on site is particularly advantageous as it can be transported in a relatively small vehicle or trailer.

With reference to FIGS. 31 to 33, the devices 100 and 1000 will now be described with a view to their use during installation of a modular home. The devices 100 and 1000 and being used in a similar manner to carry a building module (e.g. building module 10), only the operation of device 100 will be described. It will, however, be understood that device 1000 is to be used in a similar manner.

Device 100 is configured to receive a building module 10, preferably on cross-members 110a-110c. As was noted above, the width of the device 100 can be adjusted on-site, based on the width of the building module to be transported, by adjusting the length of the cross-members 110a-110c, and thus the space between the left and right wheel assemblies 102a, 102b. Preferably, the distance between the two opposing wheel assemblies 102a, 102b is adjusted to be slightly larger than the width of the building module 10 so that the building module 10 is received only on the cross-members 110a-110c. As such each set of wheel assemblies 102a, 102b is configured to support the building module 10 at a width exceeding that of the building module 10, so the wheel assemblies 102a-102b are not under the building module 10, but are outside of it. The wheels 124a, 124b of the wheel assemblies 102a, 102b are therefore configured to "stick out" from the sides of the building module 10.

With reference to FIGS. 31 to 33, per a method of installation being an implementation of the present technology, the building module 10 is received on two separate devices 100, a first device 100a, closer to a first end 20 of the building module 10, and second device 100b, closer to a second end 21 of the building module 10. The telescopic leg assemblies 122a, 122b of the first and second devices 100a, 100b are adjusted to the desired height (which is enough to clear the piles on which the building module 10 will be installed) and fastened together using fastener 131. As shown in FIG. 33, this building module has wheels 502a, 502b connected to its frame, the wheels 502a, 502b having been used during transport of the building module 10 to the installation site. These wheels 502a, 502b are removed or lifted from the ground so that the building module 10 is fully supported on the devices 100a, 100b (as shown in FIG. 33). Once the home is placed in the correct location (e.g., over piles, or other type of foundation or fixture method), the cross-members 110a-110c are unfastened from the frame members 105a, 105b and pulled out of their respective slots 120a-120b. The building module 10 is then received on the piles (or other fixtures, etc.) for attachment thereto. In the case of adjustable piles, such as those disclosed in commonly assigned U.S. application Ser. No. 15/814,907 (incorporated herein by reference in its entirety for all purposes), the piles may be adjusted to support the weight of the building module 10 before removing the cross-members 110a-110c, then readjusting the piles to the desired height.

Referring now to FIGS. 34 to 41, there is provided another embodiment of the present technology, a building module moving device 200 configured to receive a building module thereon (e.g. building module 10). In the illustrated embodiment, the device 200 is hydraulically powered and comprises a frame 202 mounted on a pair of track assemblies 204a, 204b, a turning table assembly 206 mounted onto the frame 202 and comprising a pair of hydraulic actuators 208a, 208b, as well as a support beam assembly 210 supported on the turning table assembly 206.

Figure 37:
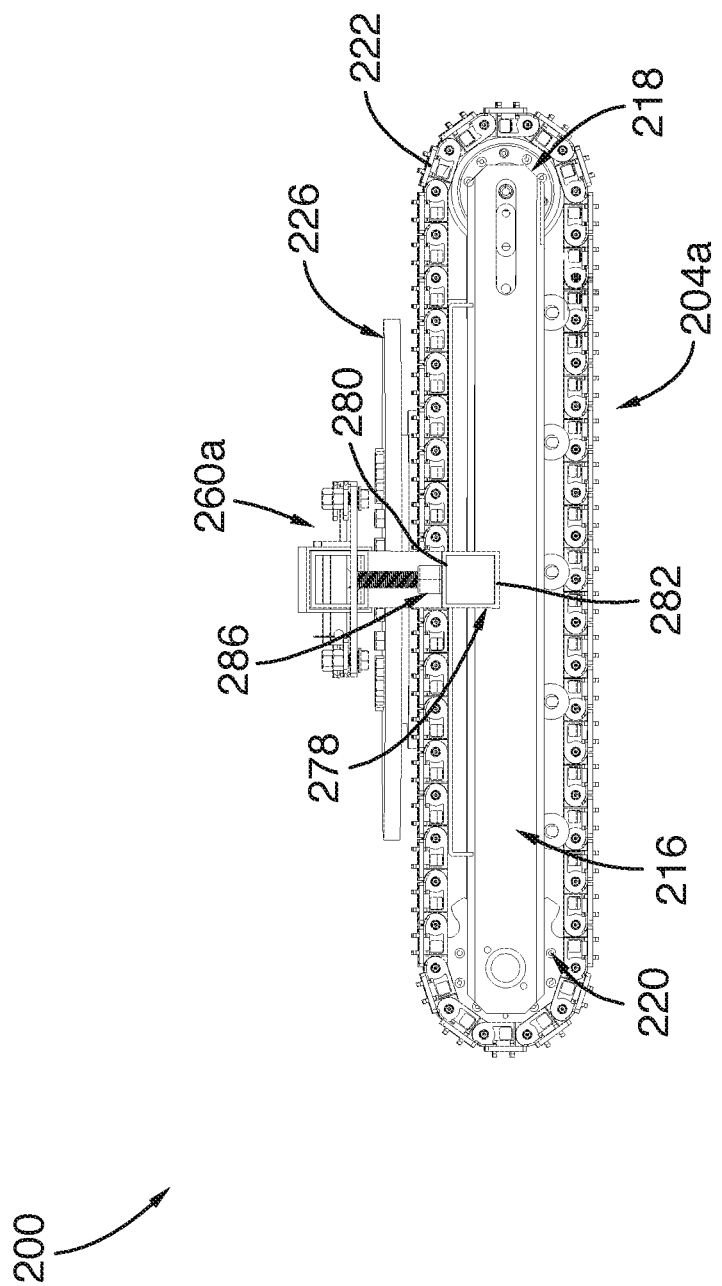
FIG. 37 is a left-side view of the device shown in FIG. 34.
Figure 39:
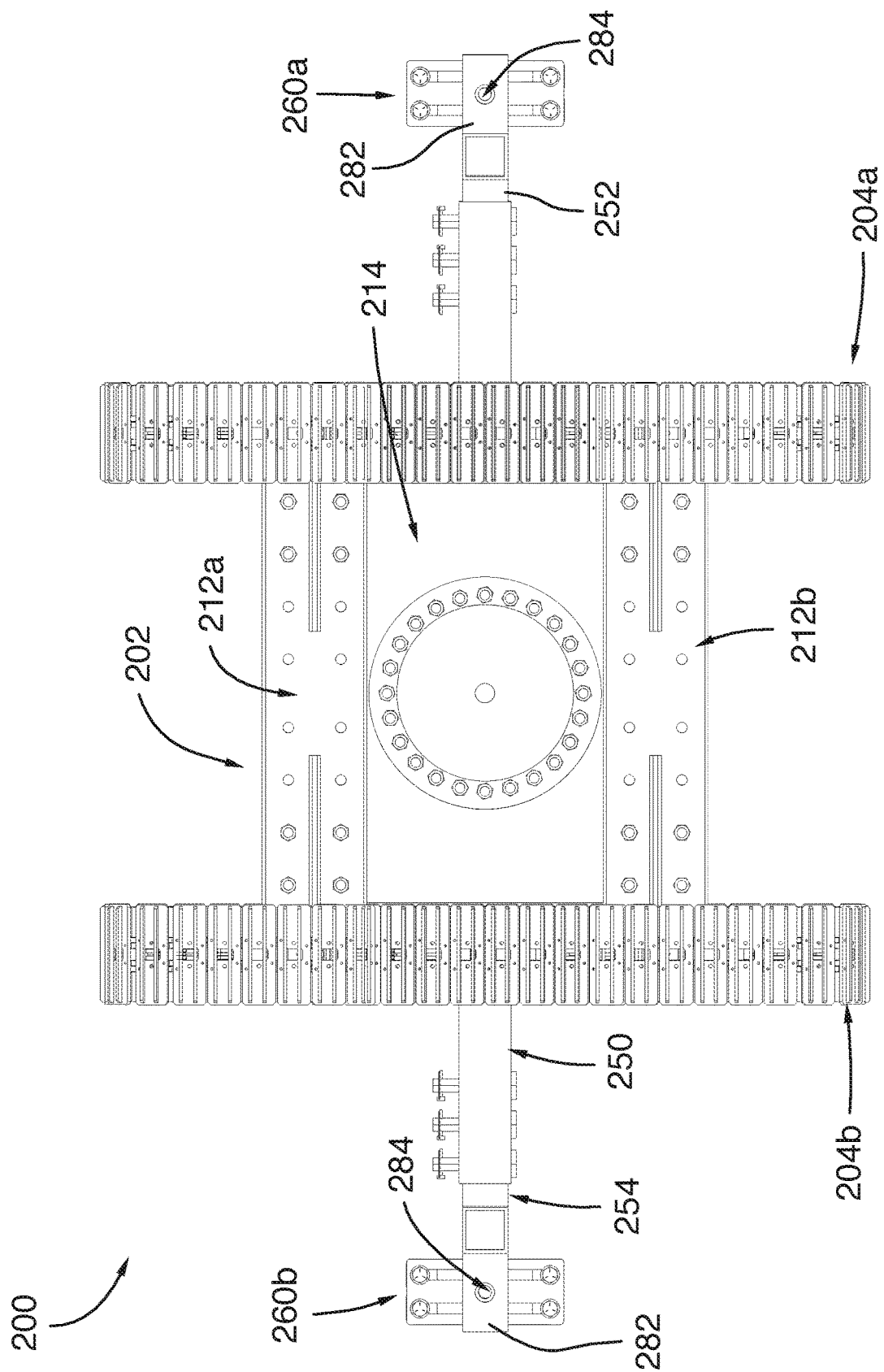
FIG. 39 is a bottom plan view of the device shown in FIG. 34.

With reference to FIG. 39, the frame 202 comprises a pair of cross-members 212a, 212b attached the track assemblies 204a, 204b, as well as a top plate 214 mounted onto the cross-members 212a, 212b, between the two track assemblies 204a, 204b. As best shown in FIG. 37, the track assemblies 204a, 204b are conventional track assemblies, each track assembly 204a, 204b comprising a track adjuster 216, an idler 218 at one end of the track adjuster 216, a drive sprocket 220 at the opposed end of the track adjuster 216, and a track 222 mounted on the idler 218 and sprocket 220, the track 222 being made of rubber or steel, as known in the art. To propel the device 200, the drive sprocket 220 of each track assembly 204a, 204b is operatively coupled to a hydraulic motor (not shown), itself coupled to a hydraulic source (not shown), as known in the art.

Mounted onto the top plate 214 of the frame 202 is the turning table assembly 206. The turning table assembly 206 comprises a slew 224 (best show in FIG. 35) onto which is mounted a rotating disc 226, for rotation relative to the frame 202, about a vertical rotation axis. In the illustrated embodiment, the two hydraulic actuators 208a, 208b are partially received in holes 228a, 228b defined in the disc 226 of the turning table assembly 206, and are configured to abut the top plate 214 of the frame 202 at their lower ends but also to rotate along with the disc 226 when it is rotated (i.e. the lower end of the actuators 208a, 208b is not fixedly attached to the top plate 214 of the frame), while their upper ends support the beam assembly 210. As it will be appreciated, the hydraulic actuators 208a, 208b could be positioned differently. For instance, they could be mounted directly on top of the disc 226, or they could be mounted to the top plate 214 and support the slew 224, onto which is mounted the disc 226. Further, while in the illustrated embodiment the turning table assembly 206 comprises two actuators 208a, 208b, it will be understood that there could be a different number of actuators.

In the illustrated embodiment, the support beam assembly 210 comprises a central loading tube 250 supported on the two hydraulic actuators 208a, 208b, two side tubes 252, 254 partially received in the central loading tube 250 and movable relative thereto, as well as two support platforms 260a, 260b engaging the frame members of the module to be transported (e.g. I-beams 500a and 500b of building module 10), as it will become apparent below. More specifically, the side tubes 252, 254 are removably and telescopically received in the central loading tube 250 so that by extending or retracting the side tubes 252, 254 into the central loading tube 250, the overall length of the support beam assembly 210 may be adjusted. The side tubes 252, 254 may be fastened to the central loading tube 250 using fasteners 262a or 262b such as nuts and bolts or pins, inserted into selected holes 264a, 264b of the side tubes 252, 254 and corresponding holes 266a, 266b of the central loading tube 250.

Figure 36:
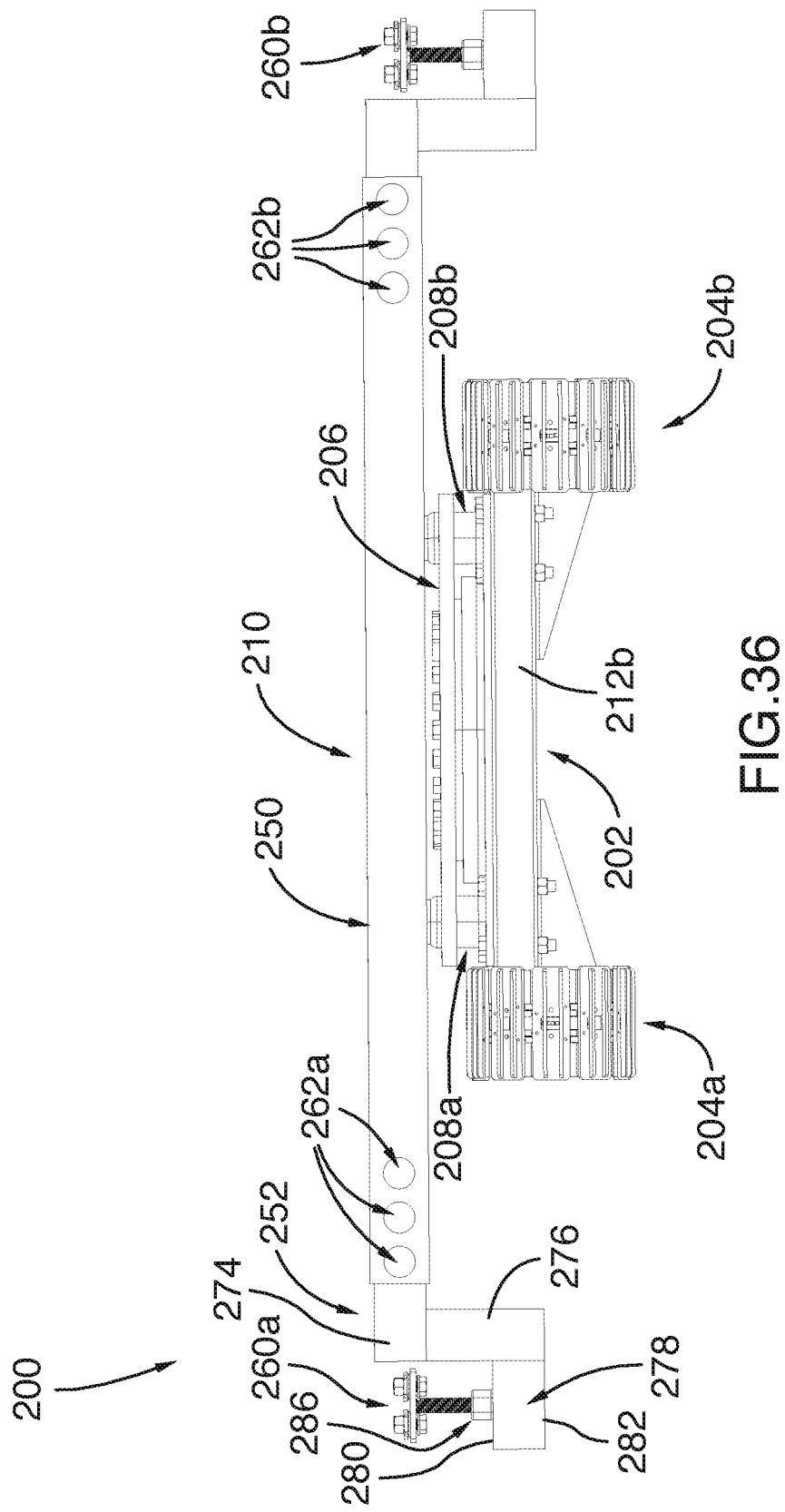
FIG. 36 is a rear elevation view of the device shown in FIG. 34.

The two side tubes 252, 254 being mirror images of one another, only side tube 252 will be described. It will be appreciated that a similar description also applies to side tube 254, with proper adaptation. Side tube 252 has a first end 270 engageable in the central loading tube 250, and a second, opposed end 272 configured for supporting a corresponding platform 260a. Between the first end 270 and the second end 272 are a first tube portion 274 (which is engageable in the central loading tube 250), a second tube portion 276 orthogonally and downwardly secured to the first tube 274 portion 250, and a third tube portion 278 secured orthogonally to an opposing end of the second tube portion 276, and extending outwardly from the device 200. As best shown in FIG. 36, the first and third tube portions 274, 278 are horizontal, while the second portion 276 extending therebetween is vertical. In an embodiment, the first, second and third tube portions 274, 276, 278 are made of HSS square tubes welded together.

The third tube portion 278 of side tube 252 is configured for receiving platform 260a, while third tube portion 278 of side tube 254 receives platform 260b. The tube portions 278 and platforms 260a, 260b being identical, only tube portion 278 of side tube 252 and platform 206a will be described. It will, however be understood that a similar description also applies to tube portion 278 of side tube 254 and platform 260b. In one embodiment, third tube portion 278 comprises a top surface 280, a bottom surface 282 and a hole 284 (best shown in FIG. 39) extending between the top and bottom surfaces 280, 282. A nut 286 abuts the top surface 280 and configured to removably receive a threaded rod 290 of the support platform 260a therein, as it will become apparent below.

Figure 40:
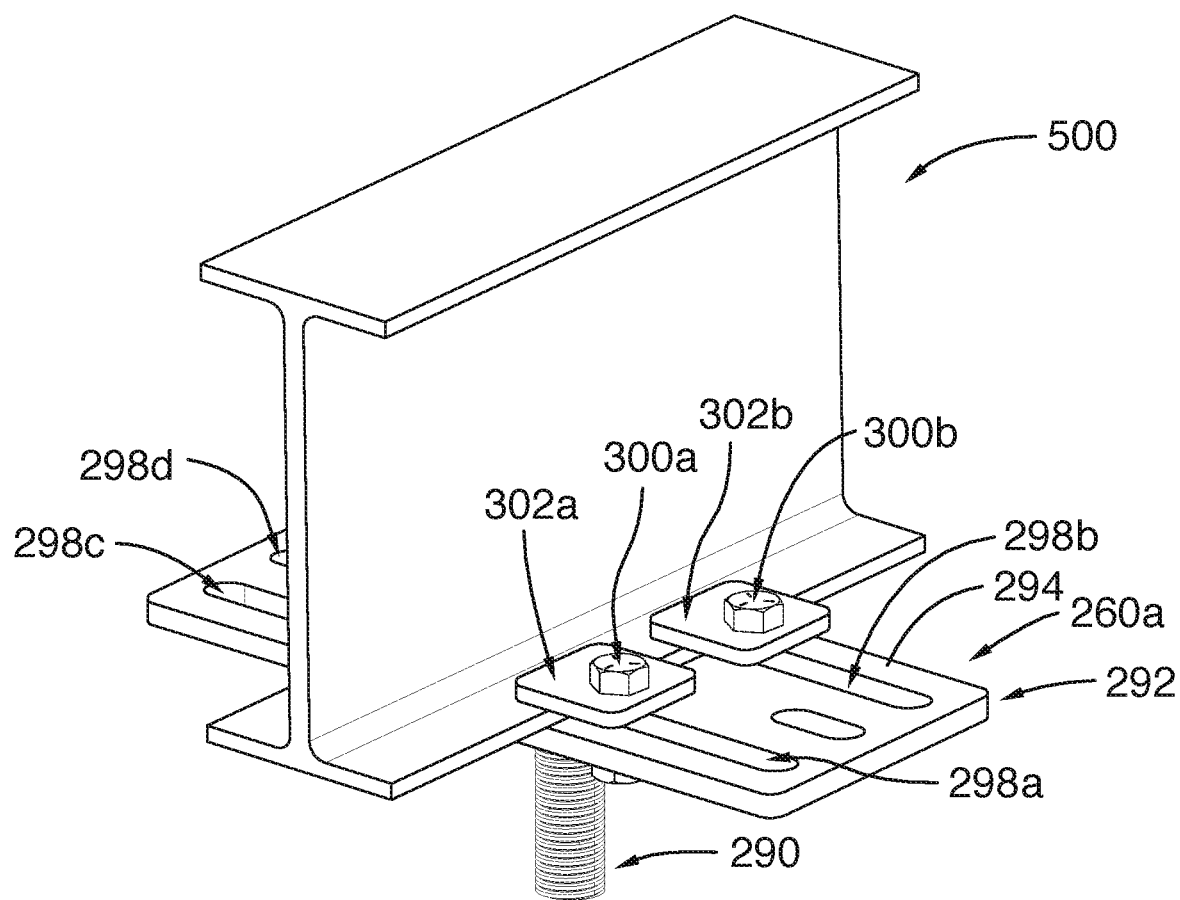
FIG. 40 is a perspective view of a support platform of the device shown in FIG. 34, engaging a beam of a building module, in accordance with one embodiment.
Figure 41:
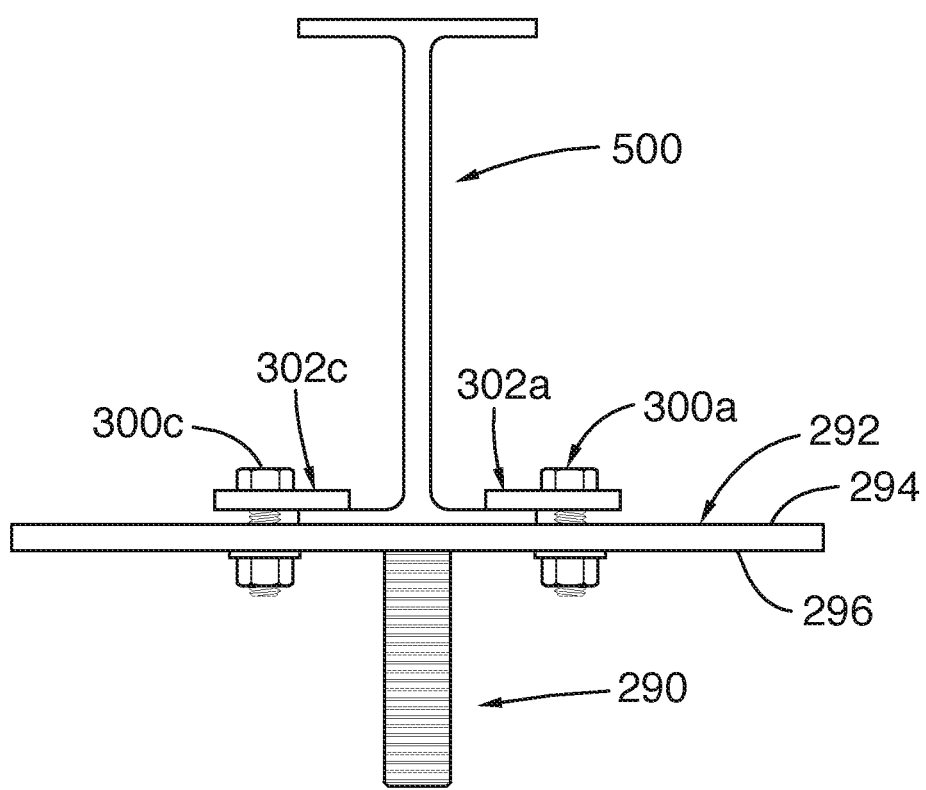
FIG. 41 is a right side perspective view of the support platform shown in FIG. 40.

Turning now to FIGS. 40 and 41, the support platform 260a will be described. In the illustrated embodiment, support platform 260a is configured to receive structural frame members in the form of I-beams 500 supporting the building module 10, and it comprises a support plate 292 extending generally horizontally and having a top face 294 and a bottom face 296, and the threaded rod 290 extending downwardly and orthogonally from the bottom face 296.

Figure 38:
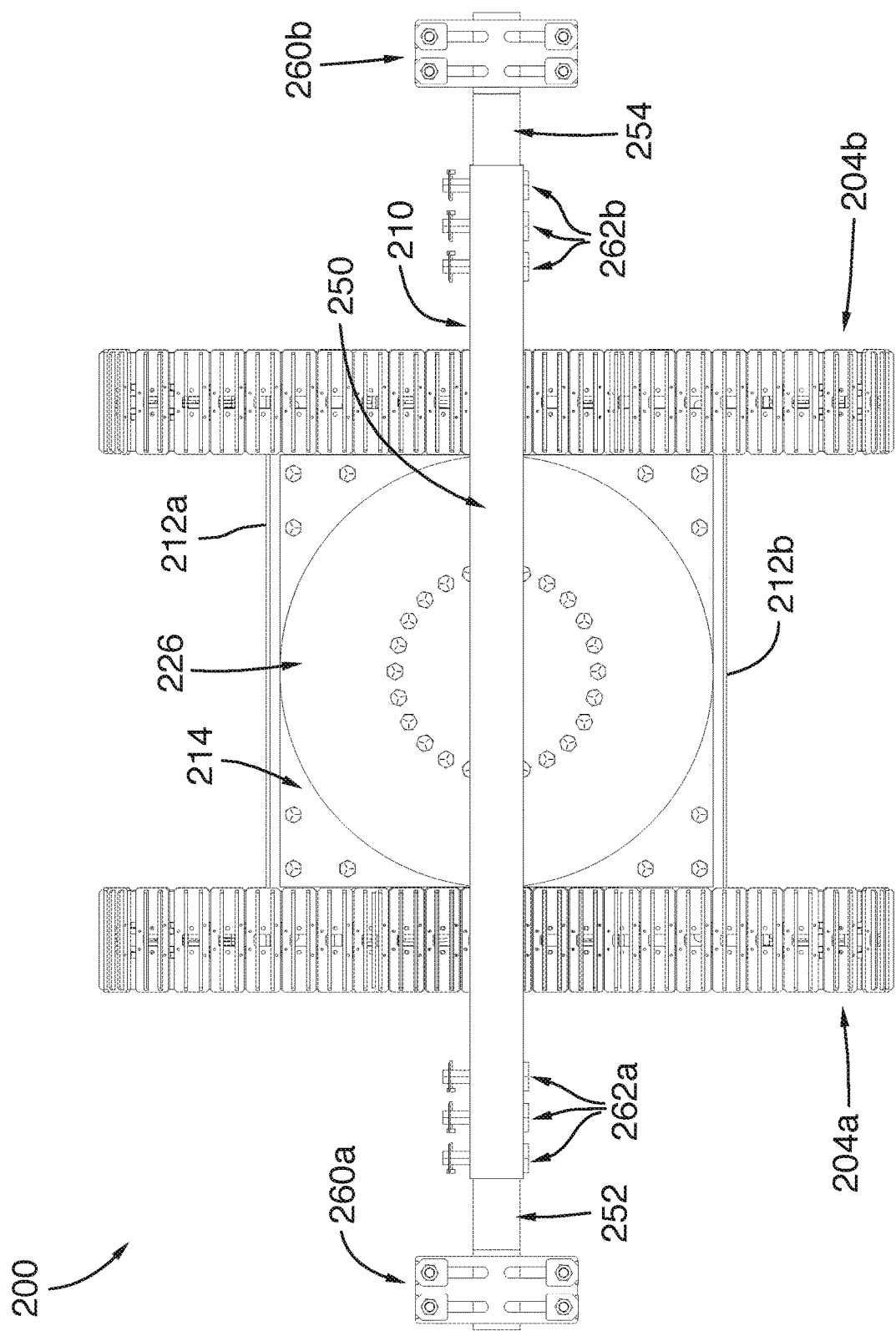
FIG. 38 is a top plan view of the device shown in FIG. 34.

The support platforms 260a also includes a plurality of elongated fastener openings (in the illustrated embodiment, 4 elongated fastener openings 298a-298d) for receiving a corresponding plurality of fasteners 300a-300d and securing members 302a-302d therein. As best shown in FIGS. 38 and 39, fasteners 300a-300d along with securing members 302a-302d are movable relative to the support plate 292 to engage the I-beam 500 of the building module 10 and to removably secured it to the support platforms 260a. In one embodiment, the fasteners 300a-300d are a bolts and nuts; in other embodiments other fastening methods are used, as would be evident to the skilled addressee.

To mount the platform 260a to the third tube portion 278 of the side tube 252, the threaded rod 290 is engaged in the nut 286 abutting the top surface 280, and then in the hole 284 by turning the nut 286 in a the appropriate direction. As it will be apparent, by turning the nut 286 in one direction or in the opposed direction, it becomes possible to adjust the height of the platform 260a relative to the third tube portion 278. While in the present embodiment, the height of the platforms 260a, 260 is adjusted by using nuts 286 engaging corresponding threaded rods 290, it will be understood that other configuration achieving a similar result would be possible. For instance, hydraulic actuators or jacks could be positioned between the third tube portion 278 and the support plate 292. Further, the width of the device 200 can be adjusted by adjusting the length of the support beam assembly 210 to the distance separating the I-beams 500 of a the building module 10 such that each I-beam is received onto a corresponding support platforms 260a, 260 and can be secured thereon. While in the illustrated embodiment the side tubes 252, 254 are designed to be manually moved relative to the central loading tube 250, hydraulic actuators could be provided to facilitate such movement of the side tubes 252, 254 relative to the central loading tube 250.

As it will be appreciated, when one wants to use the device 200 to transport or move a building module such a building module 10, the support platforms 260a, 260b are lowered as much as possible relative to the third tube portion 278, by turning the nut 286 in the appropriate direction, and the fasteners 300a-300d and securing members 302a-302b are loosened in order to me moved easily in the elongated openings 298a-298d at a later stage. Further, the width of the beam assembly 210 is adjusted by moving the side tubes 252, 254 relative to the central loading tube 250, such that the platforms 260a, 260b are in alignment with the pair of I-beams 500a, 500b of the building module 10. As such, all of the components of the device 200 will be in alignment with the space defined between the two I-beams (e.g. I-beams 500a, 500b), except for the platforms 260a, 260b and third tube portions 278 of the side tubes 252, 254 supporting them, which are in vertical alignment with the I-beams 500a, 500b. At that point, the two hydraulic actuators 208a, 208b are lowered to the maximum (i.e. at a lower position), such that the overall height of the device 200 is at its minimum, thus allowing maximum clearance between the underneath of the building module 10 and the device 200. At that point, and to the extent that the clearance is sufficient, the device 200 can be moved under the building module 10, by actuating the track assemblies 204a, 204b, until the device 200 is properly positioned under the building module 10. The platforms 260a, 260b can then be raised by turning the nut 286 in the appropriate direction, until the top surfaces 294 of the plates 292 contact the corresponding I-beams 500a or 500b. Upon reaching this step, the fasteners 300a-300d and securing members 302a-302d can be moved in the elongated slots 298a-298 until the securing members 302a-302d engage the I-beams 500a or 500b. By securing the fasteners 300a-300d, the corresponding securing members 302a-302d of the platform 260a or 260b engage the corresponding I-beam 500a or 500b, thus securing the each I-beam 500a and 500b to the corresponding platform 260a, 260b.

By raising the hydraulic actuators 208a, 208b of the device 200 toward a raised position, the support beam assembly 210 is consequently raised, which consequently lift the building module 10 to be moved. The device 200 can therefore adjust both the height of a home 10 as well as its position on a plane along the ground. In one embodiment, the support platforms 260a, 260b are at a distance of 6 inches from the ground in the lowest height and extend up to 30 inches from the ground. In another embodiment, the support platforms 260a, 260b may be less than 10 inches from the ground and extend up to 40 inches off the ground. As it will be appreciated, in a state where the second and third tube portions 276, 278 of the side tubes 252, 254, and the support platforms 260a, 260b mounted thereto are lower than the top of the track assemblies 204a, 204b, the beam assembly 210 may be orthogonal to the direction of travel of the track assemblies 204a, 204b. However, if the hydraulic actuators 208a, 208b lift the support beam assembly 210 to a height whereby second and third tube portions 276, 278 of the side tubes 252, 254, and the support platforms 260a, 260b mounted thereto are higher than the top of the track assemblies 204a, 204b, at a determined height, the rotating disc 226 of the turning table assembly 206, together with the slew 224, allow the device 200 to move in any direction along the ground. This is due to the fact that while a building module 10 loaded onto the support platforms 260a, 260b will maintain the orientation of the support platforms 260a, 260b, the tuning table assembly 206 allow the frame 202 and the track assemblies 204a, 204b to rotate about a vertical rotation axis. As it will be appreciated, by actuating differently the track assemblies 204a, 204b (e.g. at different speeds or in different directions), the device 200 can be steered, thus allowing moving the building module 10 is the desired direction.

The devices 200 carrying the building module 10 can then be moved by actuating the track assemblies 204a, 204b, until a proper location is reached, for instance when the I-beams 500a, 500b are in a vertical alignment with piles. The hydraulic actuators 208a, 208b are then lowered toward the lower position until the I-beams 500a, 500b are supported by the piles or other similar structures (not shown), and the fasteners 300a-300d and securing members 3002a-302d of the support platforms 260a, 260b are loosened to disengage from the I-beams 500a, 500b. The platforms 260a, 260 can then be lowered further relative to the I-beams 500a, 500b, by turning the nuts 286 in the appropriate direction and/or by further lowering the hydraulic actuators 208a, 208b. When the clearance between the device 200 and the building module 10 is sufficient, and the track assemblies 204a, 204b of the moving device 200 can be actuated to remove the moving device 200 from underneath the building module 10.

In an embodiment, the device 200 is configured to be powered by an external hydraulic power source (not shown). The external hydraulic power source provides power to a hydraulic motor (not shown) installed on the device 200 and coupled to the sprockets 220 for powering the track assemblies 204a, 204b, allowing the device 200 to move. In one embodiment, the hydraulic motor is connected to the track assemblies 204a, 204b through a differential transmission system and/or hydraulic motors, allowing each track assembly 204a, 204b to rotate at a different speed, which this allows the device 200 to turn. In another embodiment, there are at least two motors, each individually coupled to a single track assembly 204a or 204b for directly controlling the speed of the track. Other control methods or variations thereof as known in the art may also be employed. Alternatively, in another embodiment, the track assemblies 204a, 204b may be replaced by another type of drive assembly, for instance a drive assembly comprising wheels. The external hydraulic power (not shown) can also be coupled to the hydraulic actuators 208a, 208b, and/or to hydraulic actuators replacing the nuts 286 and threaded rods 290, between the third portions 278 of the side tubes 252, 254 and the plates 292 of the support platforms 260a, 260b, as described above. As it will be appreciated, other types of external power sources are possible without departing from the scope of the embodiments. For instance, the external hydraulic power source could be replaced with an electric power source (to power electric motors and/or actuators), a gasoline power source, a diesel power source and/or a combination thereof.

While the device 200 has been described in accordance with one embodiment, it will be appreciated that modifications are possible without departing from the scope of the embodiment. For instance, although in the embodiment described, two hydraulic jacks are provided the number and position of hydraulic jacks could vary in other embodiment as would be understood by the skilled addressee.

Further, it will be understood that one could use a combination of devices 100, 1000 and/or 200 to move a building.

As it will be appreciated, a number of variants are possible without departing from the scope of the embodiments described. For instance, it would be understood that the various elements of the devices 100, 1000 and 200 can be connected or attached to one another using a variety of methods and securing means, including bolts and nuts, pins, rivets or any other fastener that the skilled addressee may find appropriate. Furthermore, the wheel assemblies 102a, 102b of device 100 and 1006a, 1006b of device 1000 could be powered, for instance using hydraulic motors operatively couple to an external hydraulic power. Alternatively, other types of powers could be used. For instance, devices 100, 1000 and 200 could be powered using combustion engines or electric motors. Furthermore, while the various tubes of devices 100, 1000 and 200 have been described in connection with tubes having a generally square cross-section, it will be understood that other size and shape of tubes can be used (e.g. cylindrical tubes), or other types of beams (e.g. I-beams, H-beams, adjourned beams) without departing from the scope of the embodiments. Also, while the hydraulic actuators have been described to be in operatively coupled to external hydraulic power, it will be understood that such hydraulic power is not limited to hydraulic power generated by an engine or motor, but that it also includes manual hydraulic power, for instance a hydraulic pump actuated by the physical power of an individual.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A device for moving a building module along a ground surface, the device comprising:
   (a) a frame mounted on a drive assembly for allowing the device to move along the ground;
   (b) a lifting assembly mounted to the frame, the lifting assembly being operable to move between a lower position and a raised position; and
   (c) a support beam assembly mounted on the lifting assembly, the support beam assembly configured to engage the building module;
   (d) wherein when the lifting assembly moves from the lower position to the raised position, it urges the support beam assembly to move upwardly;
   (e) wherein when the lifting assembly moves from the raised position to the lower position, it urges the support beam assembly to move downwardly; and
   (f) a turning table assembly mounted between the frame and the support beam assembly, the turning table assembly allowing the support beam assembly to rotate relative to the frame about a vertical axis.

2. The device according to claim 1, wherein the drive assembly comprises a first track assembly located on a first side of the frame and a second track assembly located on a second side of the frame.

3. The device according to claim 1, wherein the lifting assembly comprises at least one actuator.

4. The device according to claim 3, wherein the at least one actuator is a hydraulic actuator.

5. The device according to claim 1, wherein the turning table assembly allows the support beam assembly to rotate relative to the frame when the support beam assembly is positioned at a determined height.

6. The device according to claim 1, wherein the support beam assembly comprises a central loading portion mounted on the lift assembly and at least one side portion, the at least one side portion being movable between a retracted position and an extended position to adjust a length of the support beam assembly.

7. The device according to claim 6, wherein the support beam assembly further comprises at least one support platform mounted to the at least one side portion, the support platform being configured to engage the building module.

8. The device according to claim 7, wherein the building module comprises at least one structural frame member and the at least one support platform is configured for engaging the at least one structural frame member of the building module.

9. The device according to claim 1, further comprising an external power source, the external power source being operatively coupled for providing power to at least one of the drive assembly and the lift assembly.

10. The device according to claim 9, wherein the external power source comprises a hydraulic power source.

11. A device for moving a building module along a ground surface, the device comprising:
   (a) a frame mounted on a drive assembly for allowing the device to move along the ground;
   (b) a lifting assembly mounted to the frame, the lifting assembly being operable to move between a lower position and a raised position;
   (c) a support beam assembly mounted on the lifting assembly, the support beam assembly configured to engage the building module;
   (d) wherein when the lifting assembly moves from the lower position to the raised position, it urges the support beam assembly to move upwardly;
   (e) wherein when the lifting assembly moves from the raised position to the lower position, it urges the support beam assembly to move downwardly; and
   (f) wherein the support beam assembly comprises a central loading portion mounted on the lift assembly and at least one side portion, the at least one side portion being movable between a retracted position and an extended position to adjust a length of the support beam assembly.

12. The device according to claim 11, wherein the drive assembly comprises a first track assembly located on a first side of the frame and a second track assembly located on a second side of the frame.

13. The device according to claim 11, wherein the lifting assembly comprises at least one actuator.

14. The device according to claim 13, wherein the at least one actuator is a hydraulic actuator.

15. The device according to claim 11, further comprising a turning table assembly mounted between the frame and the support beam assembly, the turning table assembly allowing the support beam assembly to rotate relative to the frame about a vertical axis.

16. The device according to claim 15, wherein the turning table assembly allows the support beam assembly to rotate relative to the frame when the support beam assembly is positioned at a determined height.

17. The device according to claim 11, wherein the support beam assembly further comprises at least one support platform mounted to the at least one side portion, the support platform being configured to engage the building module.

18. The device according to claim 17, wherein the building module comprises at least one structural frame member and the at least one support platform is configured for engaging the at least one structural frame member of the building module.

19. The device according to claim 11, further comprising an external power source, the external power source being operatively coupled for providing power to at least one of the drive assembly and the lift assembly.

20. The device according to claim 19, wherein the external power source comprises a hydraulic power source.

* * * * *